(12) United States Patent
Funaba et al.

(10) Patent No.: US 8,686,694 B2
(45) Date of Patent: Apr. 1, 2014

(54) DISCHARGE CIRCUIT FOR SMOOTHING CAPACITOR OF DC POWER SUPPLY

(71) Applicant: Hitachi Automotive Systems, Ltd., Hitachinaka (JP)

(72) Inventors: Seiji Funaba, Hitachinaka (JP); Yasuo Noto, Hitachinaka (JP); Masashige Tsuji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/857,219

(22) Filed: Apr. 5, 2013

(65) Prior Publication Data

US 2013/0214745 A1 Aug. 22, 2013

Related U.S. Application Data

(63) Continuation of application No. 12/852,191, filed on Aug. 6, 2010, now Pat. No. 8,436,590.

(30) Foreign Application Priority Data

Aug. 7, 2009 (JP) ................. 2009-184259

(51) Int. Cl.
*H02J 7/00* (2006.01)
*H02M 3/06* (2006.01)
*H01G 9/00* (2006.01)
*H02J 9/00* (2006.01)
*H02J 7/04* (2006.01)

(52) U.S. Cl.
CPC ............... *H02J 7/0031* (2013.01); *H02J 9/002* (2013.01); *H02J 7/045* (2013.01); *H02J 7/047* (2013.01); *H02J 7/0077* (2013.01)
USPC ............ 320/166; 320/136; 307/109; 361/502

(58) Field of Classification Search
CPC ......... H02J 7/0031; H02J 9/002; H02J 7/045; H02J 7/047; H02J 7/0077
USPC .................... 320/166, 136; 307/109; 361/502
See application file for complete search history.

(56) References Cited

U.S. PATENT DOCUMENTS

| 5,572,735 A | 11/1996 | Tanikawa |
| 5,619,107 A | 4/1997 | Shinohara et al. |

(Continued)

FOREIGN PATENT DOCUMENTS

DE    10 2008 010 980 A1    8/2009

(Continued)

OTHER PUBLICATIONS

Japanese Office Action including English language translation dated Nov. 8, 2011 (Five (5) pages). European Search Report dated Oct. 29, 2010 (Seven (7) pages).
Japanese Office Action with English Translation Dated Jul. 2, 2013 (Five (5) pages).

*Primary Examiner* — M'Baye Diao
(74) *Attorney, Agent, or Firm* — Crowell & Moring LLP

(57) ABSTRACT

A discharge circuit for a DC power supply smoothing capacitor that is used in a power conversion device that supplies DC power via a switch to the DC power supply smoothing capacitor and an inverter, includes; a resistor that discharges charge in the capacitor; a switch connected in series with the resistor, that either passes or intercepts discharge current flowing from the capacitor to the resistor; a measurement circuit that measures a terminal voltage of the capacitor; and a control circuit that controls continuity and discontinuity of the switch; wherein the control circuit, after having made the switch continuous and starting discharge of the capacitor by the resistor, if a terminal voltage of the capacitor as measured by the measurement circuit exceeds a voltage decrease characteristic set in advance, makes the switch discontinuous and stops discharge by the resistor.

7 Claims, 15 Drawing Sheets

(56) References Cited

U.S. PATENT DOCUMENTS

| | | |
|---|---|---|
| 6,002,221 A | 12/1999 | Ochiai et al. |
| 6,960,899 B2 * | 11/2005 | Kobayashi et al. ........... 320/136 |
| 7,746,049 B2 | 6/2010 | Sato |
| 8,115,457 B2 | 2/2012 | Balakrishnan et al. |
| 2007/0279010 A1 | 12/2007 | Okamura et al. |
| 2008/0024079 A1 | 1/2008 | Matsubara et al. |
| 2009/0033294 A1 | 2/2009 | Odajima et al. |
| 2010/0318248 A1 | 12/2010 | Higuchi et al. |

FOREIGN PATENT DOCUMENTS

| | | |
|---|---|---|
| JP | 58-183098 U | 12/1983 |
| JP | 5-78194 U | 10/1993 |
| JP | 6-245485 A | 9/1994 |
| JP | 10-257778 A | 9/1998 |
| JP | 11-69881 A | 3/1999 |
| JP | 2000-78851 A | 3/2000 |
| JP | 2000-278802 A | 10/2000 |
| WO | WO 2009/106187 A1 | 9/2009 |

* cited by examiner

DISCHARGE CIRCUIT FOR SMOOTHING CAPACITOR OF DC POWER SUPPLY

CROSS-REFERENCE TO RELATED APPLICATIONS

This application is a continuation of U.S. application Ser. No. 12/852,191, filed on Aug. 6, 2010, which claims priority to Japanese Patent Application No. 2009-184259, filed Aug. 7, 2009, the entire disclosures of which are hereby incorporated by reference.

BACKGROUND OF THE INVENTION

1. Field of the Invention

The present invention relates to a discharge circuit for a smoothing capacitor of a DC power supply that is used in an electrical power conversion device of an inverter or the like.

2. Description of the Related Art

An inverter that is used for driving a motor of a hybrid automobile or the like has a function of converting DC power supplied from a DC power supply into AC power to be supplied to an AC electric load such as a rotating electrical machine or the like, and/or a function of converting AC electrical power generated by a rotating electrical machine into DC power to be supplied to a DC power supply. In order to fulfill these conversion functions, such an inverter is equipped with an electrical power conversion circuit that uses switching elements, and performs electrical power conversion from DC power into AC power, or from AC power into DC power, by repeatedly making these switching elements continuous and discontinuous.

In such an inverter, a high capacity DC power supply smoothing capacitor is provided for stabilizing voltage fluctuations of the DC power supply during operation. Furthermore, an interrupter such as a contactor or the like is provided between the battery and this DC power supply smoothing capacitor, so that, when the hybrid automobile is to be driven, a traveling motor can be powered by operating the inverter after the contactor has been closed (hereinafter, this is termed "turned ON") and the capacitor has been charged up. On the other hand, when the hybrid automobile has been stopped, the contactor is opened (hereinafter, this is termed "turned OFF") and then the capacitor is discharged via a discharge circuit.

A control device for an electric automobile is per se known with which, in order to determine whether there is any fault with the contactor or the discharge circuit for such an inverter, it is arranged to monitor the terminal voltage across the DC power supply smoothing capacitor from the time point that the hybrid automobile is stopped, and: it is decided that no fault is occurring if, when a certain time period T1 (for example, 40 seconds) has elapsed after the automobile has been stopped, the terminal voltage of the capacitor has not fallen below a predetermined value; it is decided that there is some fault with the discharge circuit if, when another certain time period T2 (for example, 5 minutes) has elapsed after the automobile has been stopped, this voltage has fallen below a predetermined value; and it is decided that there is some fault with the contactor if, even though the time period T2 has elapsed after the automobile has been stopped, this voltage does not decrease at all (for example, refer to Japanese Laid-Open Patent Publication H10-257778).

SUMMARY OF THE INVENTION

However with the prior art control device described above if, after the automobile has been stopped, for some reason the contactor turns to ON (closed) after the start of discharging of the capacitor by the discharge circuit, then because the current from the battery flows the discharge circuit, a large current will continue to flow in the discharge circuit for quite a long period of time.

According to the 1st aspect of the present invention, a discharge circuit for a DC power supply smoothing capacitor that is used in a power conversion device that supplies DC power via a switch to the DC power supply smoothing capacitor and an inverter, comprises: a resistor that discharges charge in the capacitor; a switch connected in series with the resistor, that either passes or intercepts discharge current flowing from the capacitor to the resistor; a measurement circuit that measures a terminal voltage of the capacitor; and a control circuit that controls continuity and discontinuity of the switch; wherein the control circuit, after having made the switch continuous and starting discharge of the capacitor by the resistor, if a terminal voltage of the capacitor as measured by the measurement circuit exceeds a voltage decrease characteristic set in advance, makes the switch discontinuous and stops discharge by the resistor.

According to the 2nd aspect of the present invention, in the discharge circuit for a DC power supply smoothing capacitor according to the 1st aspect, it is preferred that the voltage decrease characteristic is set according to characteristic of discharge of the capacitor by the resistor.

According to the 3rd aspect of the present invention, in the discharge circuit for a DC power supply smoothing capacitor according to the 2nd aspect, it is preferred that the control circuit makes the decision as to whether to continue or stop discharge at intervals determined in advance, based on comparison between a terminal voltage of the capacitor as measured by the measurement circuit, and the voltage decrease characteristic.

According to the 4th aspect of the present invention, in the discharge circuit for a DC power supply smoothing capacitor according to the 3rd aspect, it is preferred that the control circuit obtains the voltage decrease characteristic by calculation based on a terminal voltage of the capacitor before the start of discharge as measured by the measurement circuit, and a time constant that is determined by a capacitance value of the capacitor and a resistance value of the resistor, and makes the decision as to whether to continue or stop discharge by comparing together the voltage decrease characteristic that is the result of the calculation, and a terminal voltage of the capacitor as measured by the measurement circuit.

According to the 5th aspect of the present invention, in the discharge circuit for a DC power supply smoothing capacitor according to the 3rd aspect, it is preferred that the control circuit decides as to whether to continue or stop discharge by comparing together a ratio between a terminal voltage of the capacitor measured this time by the measurement circuit and a terminal voltage of the capacitor measured last time, and a coefficient that is set based on a time constant that is determined by a capacitance value of the capacitor and a resistance value of the resistor.

According to the 6th aspect of the present invention, in the discharge circuit for a DC power supply smoothing capacitor according to any one of the aspects 3 through 5, it is preferred that the control circuit lengthens the time intervals in correspondence to elapsed time after start of discharge.

According to the 7th aspect of the present invention, in the discharge circuit for a DC power supply smoothing capacitor according to the 1st aspect, it is preferred that if a terminal voltage of the capacitor has exceeded the voltage decrease characteristic and the control circuit has stopped discharge by the resistor, the control circuit does not start discharge until a first predetermined time period has elapsed.

According to the 8th aspect of the present invention, in the discharge circuit for a DC power supply smoothing capacitor according to the 7th aspect, it is preferred that when for the first time a terminal voltage of the capacitor has exceeded the voltage decrease characteristic and the control circuit has stopped discharge, the control circuit waits before resuming discharge until a second predetermined time period has elapsed that is substantially shorter than the first predetermined time period, while, when the control circuit has stopped discharge for the second and subsequent times, the control circuit waits until the first predetermined time period has elapsed before resuming discharge.

According to the 9th aspect of the present invention, in the discharge circuit for a DC power supply smoothing capacitor according to the 1st aspect, it is preferred that the switch comprises a first switch and a second switch connected in series, and further comprising a detection circuit that detects occurrence of a short circuiting fault in the first switch; and wherein the control circuit normally starts and stops discharge by making continuous and interrupting the first switch with the second switch remaining continuous, but interrupts the second switch and stops discharge if, when discharge is to be stopped, occurrence of a short circuiting fault in the first switch has been detected by the detection circuit.

According to the 10th aspect of the present invention, in the discharge circuit for a DC power supply smoothing capacitor according to the 1st aspect, it is preferred that the resistor comprises a first resistor that has a first resistance value and a second resistor that has a second resistance value that is lower than the first resistance value; the switch comprises a third switch that is connected in series with the first resistor and performs passage or interception of discharge current flowing from the capacitor to the first resistor, and a fourth switch that is connected in series with the second resistor and performs passage or interception of discharge current flowing from the capacitor to the second resistor; and the control circuit starts discharge of the capacitor by the first resistor by making the third switch continuous, and, when a terminal voltage of the capacitor as measured by the measurement circuit reaches a predetermined voltage or less, makes the fourth switch continuous and starts discharge of the capacitor by the second resistor in addition to discharge of the capacitor by the first resistor.

According to the present invention, even if during discharge of the capacitor by the resistor the switch stays ON for some reason, it is still possible reliably to prevent discharge by the resistor, and it is possible to prevent a discharge current from continuing to flow in the resistor.

DESCRIPTION OF THE PREFERRED EMBODIMENTS

Various embodiments of the present invention as applied to an inverter for driving a motor of a hybrid automobile will now be explained. It should be understood that the discharge circuit for a smoothing capacitor of a DC power supply of the present invention is not limited to this application to an inverter for driving the motor of a hybrid automobile; it can also of course be applied to an inverter that is used in an electric automobile of a general type, to a power conversion device such as an inverter or a DC-DC converter or the like that is used for an electric vehicle, ship, aircraft, or the like, to all types of power conversion devices that are generally used in industry, or to a power conversion device for a household solar power generation system or to one for an electric motor that drives a electrical household product; and in all these cases it will possible to obtain the same type of beneficial effect as in the case of application to the inverters of the embodiments described hereinafter.

Figure 1:
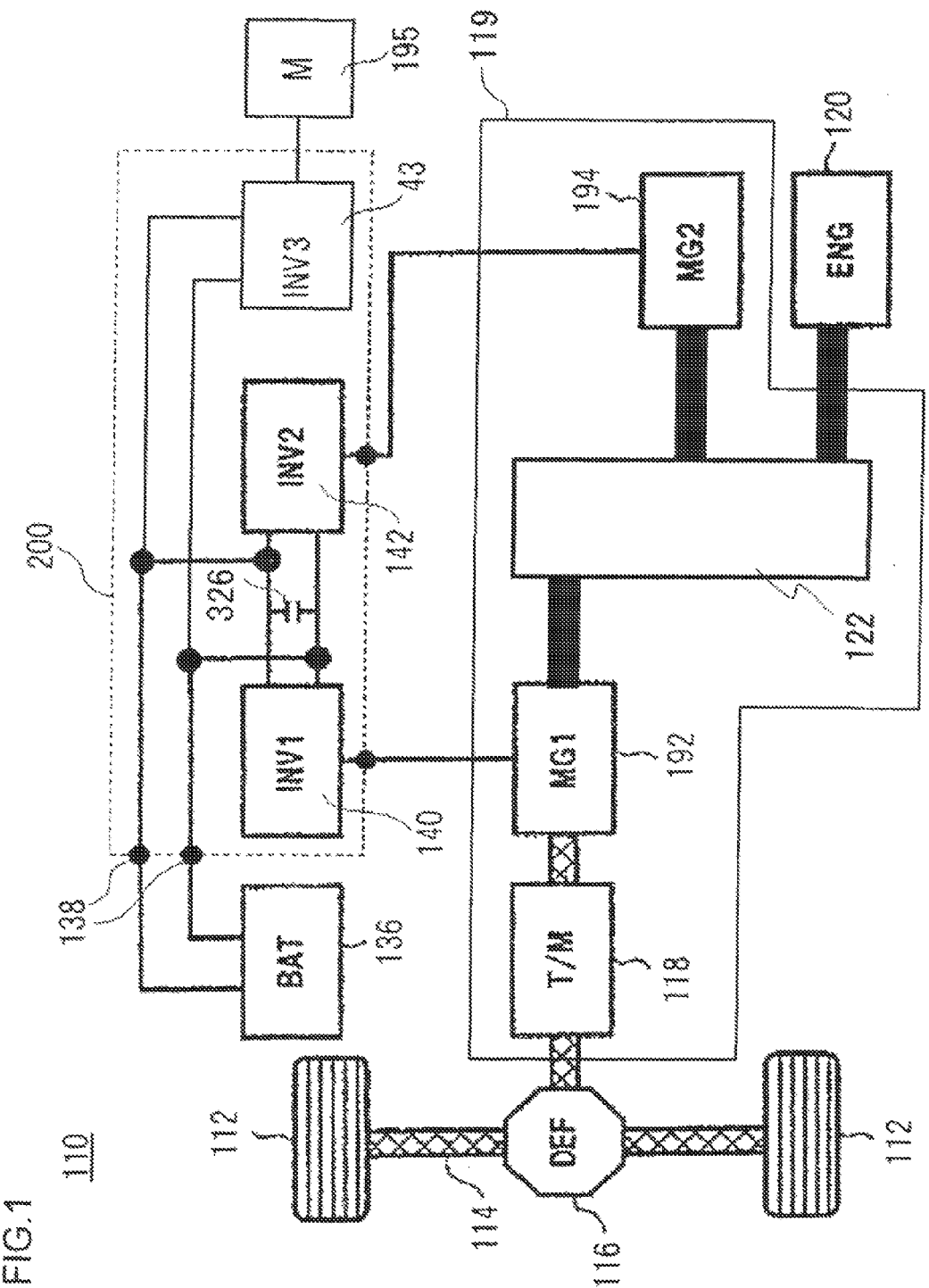
FIG. 1 is a figure showing control blocks of a hybrid automobile.

FIG. 1 is a figure showing control blocks of a hybrid automobile. A power conversion device for an electrical machinery system that is equipped to an automobile, and in particular one that is used for an electrical machinery system for driving a vehicle, is subjected to a very severe surrounding environment and to a very severe operational environment. An inverter for driving a vehicle on the one hand converts DC power supplied from an onboard battery or an onboard electricity generation device into AC power, and supplies this AC power to an AC electric motor for driving the vehicle; and on the other hand performs the inverse conversion of AC power generated by the AC electric motor for driving the vehicle into DC power, that it supplies to the onboard battery for charging it up.

Referring to FIG. 1, a hybrid electric automobile 110 (hereinafter termed a "HEV") is a single electrically powered vehicle that is equipped with two vehicle drive systems. One of these is an engine system that utilizes an internal combustion engine (ENG) 120 as a drive source. This engine system is principally used as a source of drive power for the HEV 110. The other drive system is an onboard electrical machinery system that utilizes two motor-generators 192 and 194 (MG1 and MG2) as sources of drive force. This onboard electrical machinery system is principally used as a source of drive force for the HEV 110, and as a power generation source for the HEV 110. The motor-generators 192 and 194 may, for example, be synchronous motors or induction motors, and in this specification they will be referred to as motor-generators, since, according to operational mode, each of them can operates either as a motor or as a generator.

Front wheel shafts 114 are rotatably supported at the front portion of the body of the vehicle, and a pair of front wheels 112 are provided upon the ends of these front wheel shafts 114. Moreover, a pair of rear wheel shafts (not shown) are rotatably supported at the rear portion of the vehicle body, and a pair of rear wheels (also not shown) are provided upon the ends of these rear wheel shafts. While, with the HEV 110 of this embodiment, the so-called front wheel drive configuration is employed in which the main wheels that are powered by drive force are the front wheels 112, and the trailing wheels that free-wheel are the rear wheels (not shown), the present invention could also be applied to the reverse configuration, i.e. to a HEV that employs the rear wheel drive configuration.

A front wheel side differential gear system 116 (hereinafter termed the "front wheel differential") is provided at the central portion between the two front wheel shafts 114. The front wheel shafts 114 are mechanically connected to the output sides of this front wheel differential 116. Furthermore, the output shaft of a speed change mechanism 118 is mechanically connected to the input side of the front wheel differential 116. The front wheel differential 116 is a differential type drive force distribution mechanism that distributes the rotational drive force transmitted and speed-changed by the speed change mechanism (i.e. transmission) 118 between the left and right front wheel shafts 114. The output side of the motor-generator 192 is mechanically connected to the speed change mechanism 118. Furthermore, the output side of the engine 120 and the output side of the motor-generator 194 are mechanically connected to the input side of the motor-generator 192 via a drive force distribution mechanism 122. It should be understood that the motor-generators 192 and 194 and the drive force distribution mechanism 122 are stored in the interior of the casing 119 of the speed change mechanism 118.

The motor-generators 192 and 194 are synchronous motors whose rotors incorporate permanent magnets, with AC power supplies to fixed armature windings thereof being controlled by inverter devices 140 and 142 (INV1 and INV2), and thereby drive control of the motor-generators 192 and 194 is performed. A battery (BAT) 136 is electrically connected to the inverter devices 140 and 142, so that transfer of power can be performed between the battery 136 and the inverter devices 140 and 142.

The HEV 110 of this first embodiment includes two motor-generator units, i.e. a first motor-generator unit that includes the motor-generator 192 and the inverter device 140, and a second motor-generator unit that includes the motor-generator 194 and the inverter device 142; and usage is divided between these according to the current operational state. In other words, when the vehicle is being driven by the drive force from the engine 120, if the drive torque of the vehicle is to be assisted, the second motor-generator unit is operated as an electricity generation unit by the drive force from the engine 120, while the first motor-generator unit is operated as an electrically driven unit using the power that is generated in this way. Moreover, in a similar way, when the speed of the vehicle is to be assisted, the first motor-generator unit is operated as an electricity generation unit by the rotational force from the engine 120, while the second motor-generator unit is operated as an electrically driven unit using the power that is generated in this way.

Furthermore, with the HEV of this first embodiment, it is possible to operate the first electric drive/generator unit as an electrical drive unit using the power of the battery 136, so as to drive the vehicle only with the drive force of the motor-generator 192. Yet further, with the HEV of this first embodiment, it is possible to operate the first electric drive/generator unit or the second electric drive/generator unit as an electricity generation unit with the drive power from the engine 120, or with drive power from the vehicle wheels, so as to charge up the battery 136.

The battery 136 is also used as a power supply for driving an auxiliary machinery motor (M) 195. In such auxiliary machinery there may be incorporated, for example, a motor that drives a compressor for an air conditioner, or a motor that drives a hydraulic pump for control; DC power is supplied from the battery 136 to an inverter device 43 (INV3), and is converted into AC power by the inverter device 43 and supplied to the motor 195. This auxiliary machinery inverter device 43 is endowed with a function similar to that of the inverter devices 140 and 142 for driving the vehicle, and controls the phase, the frequency, and the power of the AC that it supplies to the motor 195. For example, the motor 195 generates torque due to AC power having a phase that leads with respect to the rotation of the rotor of the motor 195 being supplied. Conversely, by AC power having a delayed phase being generated, the motor 195 operates as a generator, so that the motor 195 performs regenerative braking operation. The control function of this type for the inverter device 43 is the same as the control functions for the inverter devices 140 and 142. While the maximum conversion power of the inverter device 43 is smaller than those of the inverter devices 140 and 142 since the capacity of the motor 195 is smaller than the capacities of the motor-generators 192 and 194, the circuit structure of the inverter device 43 is fundamentally the same as the circuit structures of the inverter devices 140 and 142.

A capacitor 326 is used for DC power supply smoothing, and, while this may in practice be made as a high capacity capacitor module by connecting a number of capacitors capacity in parallel or series-parallel, in this specification it will be described as a single capacitor. This capacitor 326 is in close electrical relationship with the inverter devices 140, 142 and 43, and moreover these all have the common feature of needing countermeasures against generation of heat. Furthermore, it is desirable to make the volumes of the inverter devices as small as possible. From these points of view, in the power conversion device that is described in detail hereinafter, the inverter devices 140 and 142, the inverter device 43, and the capacitor 326 are housed within the chassis of the power conversion device. With this type of structure, it is possible to implement a device that is compact and whose reliability is high.

Furthermore, by housing the inverter devices 140 and 142, the inverter device 43, and the capacitor 326 within a single chassis, the beneficial effects are obtained that it is possible to simplify the wiring and to implement countermeasures against noise. Yet further, it is possible to reduce the inductances of the circuitry that connects the capacitor 326, the inverter devices 140 and 142, and the inverter device 43, and due to this not only is it possible to prevent the generation of spike voltage, but also it is possible to anticipate the reduction of heat generation and the enhancement of heat dissipation efficiency.

Figure 2:
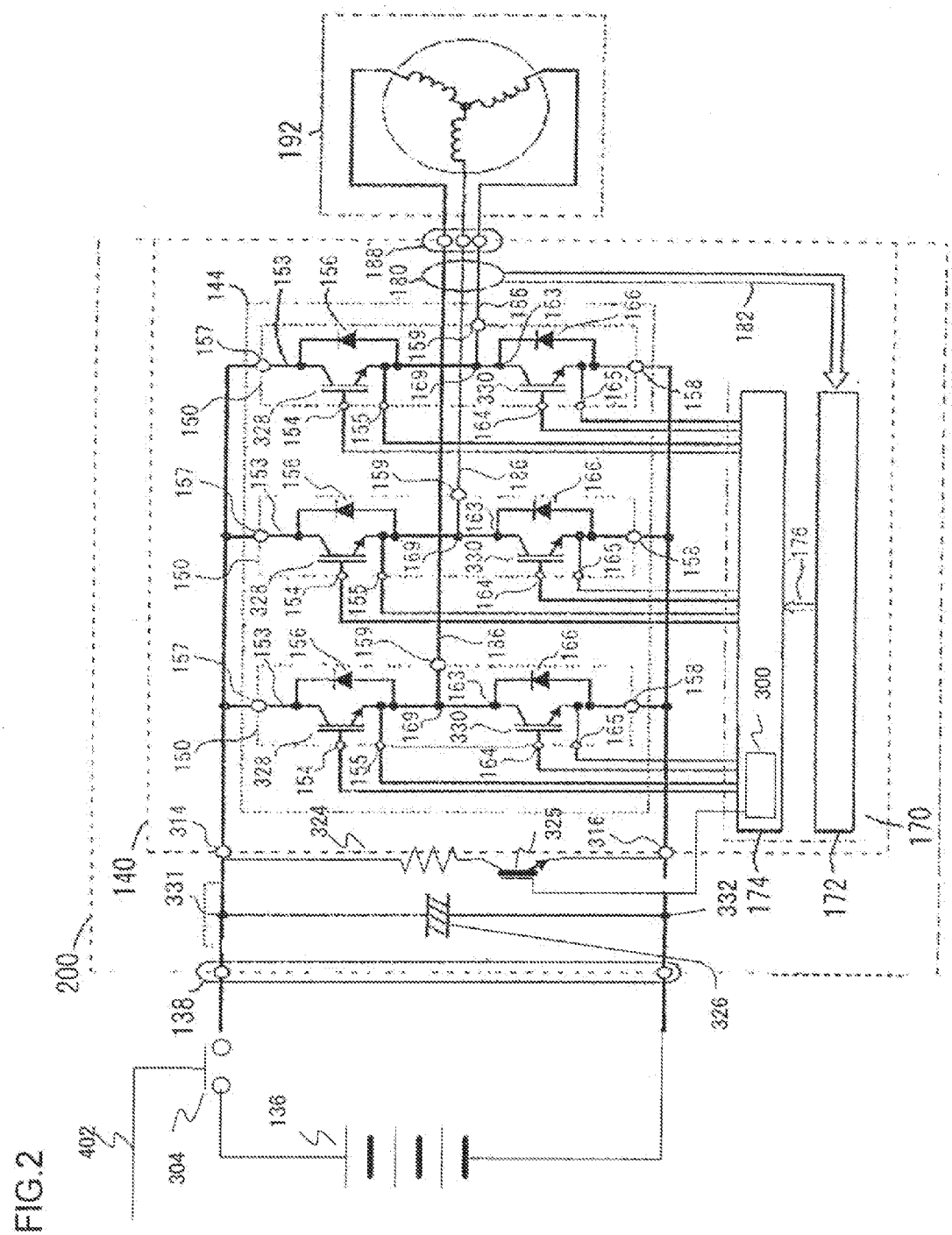
FIG. 2 is an electrical circuit diagram of an inverter device.

FIG. 2 is a circuit diagram for one of the inverter devices. The circuit structure of the inverter devices 140 and 142 and the inverter device 43 will be explained with reference to this figure. Since each of the inverter devices 140, 142, and 43 has the same circuit structure and the same operations and functions, here the inverter device 140 will be explained as a representative.

A power conversion device 200 includes the inverter device 140 and the capacitor 326, and the inverter device 140 includes an inverter circuit 144 and a motor controller 170. And the inverter circuit 144 comprises a plurality of circuits 150 each including an in-series connected upper arm and lower arm (in the example shown in FIG. 2, three circuits 150 of in-series connected upper arm and lower arm), with each of these upper arm including an IGBT (Insulated Gate type Bipolar Transistor) 328 and a diode 156 and operating as an upper arm, and each of these lower arm including an IGBT (Insulated Gate type Bipolar Transistor) 330 and a diode 166 and operating as a lower arm; and an intermediate electrode 169 of each of the upper and lower arm series circuits 150 is connected via an AC terminal 159 to an AC power line (i.e. an AC bus bar) 186, thus being connected via the AC power line 186 to the motor-generator 192. The motor controller includes a driver circuit 174 that controls the operation of the inverter circuit 144, and a control circuit 172 that supplies a control signal to the driver circuit 174 via a signal line 176.

The IGBTs 328 and 330 in the upper and lower arms are semiconductor elements for power switching, and are operated by drive signals from the motor controller 170 so as to convert DC power supplied from the battery 136 into three phase AC power. This power that has been converted is supplied to the armature windings of the motor-generator 192. The inverter circuit 144 is built as a three phase bridge circuit in which the upper and lower arm series circuits 150 for each of three phases are electrically connected in parallel between a DC positive terminal 314 and a DC negative terminal 316, and this DC positive terminal 314 and DC negative terminal 316 are respectively connected to the positive electrode side and the negative electrode side of the battery 136.

The IGBTs 328 and 330 have respective collector electrodes 153 and 163, emitter electrodes (emitter electrode terminals 155 and 165 for monitoring), and gate electrodes (gate electrode terminals 154 and 164). Diodes 156 and 166 are electrically connected respectively between the collector electrode sides of the IGBTs 328 and 330 and their emitter electrode sides, as shown in the figure. Each of the diodes 156 and 166 has two electrodes, a cathode electrode and an anode electrode, and their cathode electrodes are electrically connected respectively to the collector electrode sides of the IGBTs 328 and 330 while their anode electrodes are electrically connected to the emitter electrodes of the IGBTs 328 and 330, so that the forward directions of the diodes 156 and 166 are respectively in the directions from the emitter electrode sides of the IGBTs 328 and 330 towards their collector electrode sides. While, in this first embodiment, an example is shown in which the IGBTs 328 and 330 are used as the semiconductor elements for power switching, it would also be acceptable to use MOSFETs (Metallic Oxide Semiconductor type Field Effect Transistors) as these switching elements for power switching. In such a case, the diodes 156 and 166 would not be required.

The upper and lower arm series circuits 150 are provided for each of three phases, corresponding to each of the three phase armature windings of the motor-generator 192. Each of the three upper arm and the three lower arm series circuits 150 is connected to the U phase, the V phase, or the W phase of the motor generator 192 via an AC terminal 159 from an intermediate electrode 169, to which the emitter electrode of the IGBT (in the case of an upper arm IGBT 328) or the collector electrode 163 of the IGBT (in the case of a lower arm IGBT 330) is connected. In each pair, the upper and lower arm series circuits 150 are connected in parallel. The collector electrodes 153 of the upper arm IGBTs 328 are each electrically connected (i.e. are connected via the DC bus bars) to the positive electrode side capacitor electrode 331 of the capacitor 326 via the positive terminals 157 (i.e. the P terminals), while the emitter electrodes of the lower arm IGBTs 330 are each electrically connected to the negative electrode side capacitor electrode 332 of the capacitor 326 via the negative terminals 158 (i.e. the N terminals). The intermediate electrodes 169 at the connection portions between the emitter electrodes of the upper arm IGBTs 328 and the collector electrodes of the lower arm IGBTs 330 are electrically connected to the armature windings of the motor-generator 192 of the corresponding phases via an AC connector 188.

The capacitor 326 acts as a smoothing circuit for suppressing fluctuations of the DC voltage generated by the switching operation of the IGBTs 328 and 330. Via DC connectors 138, the positive electrode side of the battery 136 is connected to the positive electrode side capacitor electrode 331 of the capacitor 326, while the negative electrode side of the battery 136 is connected to the negative electrode side capacitor electrode 332 of the capacitor 326. Due to this, the capacitor 326 is connected to the so called DC link of the inverter, i.e. between the collector electrodes 153 of the upper arm IGBTs 328 and the positive electrode side of the battery 136, and the emitter electrodes of the lower arm IGBTs 330 and the negative electrode side of the battery 136, and thus is electrically connected to the battery 136 and the upper and lower arm series circuits 150 in parallel.

The motor controller 170 is a circuit for operating the IGBTs 328 and 330, and includes a control circuit 172 that generates timing signals for controlling the timings of switching of the IGBTs 328 and 330 on the basis of information that is inputted from other control devices or sensors or the like, and a drive circuit 174 that generates a drive signal for causing the switching operations of the IGBTs 328 and 330 on the basis of these timing signals outputted from the control circuit 172.

The control circuit 172 includes a microcomputer (not shown in the figures) for performing processing for calculating the switching timings for the IGBTs 328 and 330. As input information, a target torque value that is requested for the motor-generator 192, values of current currently being supplied to the armature windings of the motor-generator 192 from the upper and lower arm series circuits 150, and the position of the magnetic poles of the rotor of the motor-generator 192, are inputted to this microcomputer. The target torque value is a value based upon a command signal outputted from a higher level control device not shown in the figures, and the current values are values that are determined on the basis of a detection signal outputted from a current sensor 180. Moreover, the magnetic pole position is a value that is determined on the basis of a detection signal outputted from a rotating magnetic pole sensor not shown in the figures that is provided to the motor-generator 192. While in this first embodiment an example is described in which the AC current value for each of the three phases is detected, it would also be acceptable to arrange only to detect AC current values for two of the phases.

The microcomputer (not shown) incorporated in the control circuit 172 calculates current command values for the d-q axes of the motor-generator 192 on the basis of the target torque value, then calculates voltage command values for the d-q axes on the basis of the differences between the current command values for the d-q axes that are the result of the above calculation and the current values for the d-q axes that have been detected, and then converts these voltage command values for the d-q axis to voltage command values for the U phase, the V phase, and the W phase on the basis of the magnetic pole position that has been detected. And pulse modulated waves are generated by comparing together fundamental waves (sine waves) based upon these voltage command values for the U phase, the V phase, and the W phase and carrier waves (triangular waves), and these modulated waves are outputted to the driver circuit 174 as PWM (Pulse Width Modulation) signals.

When driving the lower arm, the driver circuit 174 amplifies the PWM signal described above and outputs it as a drive signal to the gate electrode of the corresponding IGBT 330 of the lower arm. Furthermore, when driving the upper arm, it amplifies the PWM signal after having shifted the level of the reference potential of the PWM signal to the level of the reference potential of the upper arm, and outputs it as a drive signal to the gate electrode of the corresponding IGBT 328 of the upper arm. Due to this, each of the IGBTs 328 and 330 performs switching operation on the basis of the drive signal that is inputted.

The motor controller 170 performs detection of anomalies such as excess current, excess voltage, excess temperature and so on, and thereby protects the upper and lower arm series circuits 150. For this purpose, sensing information is inputted to the motor controller 170. For example, information about the current that flows in the emitter electrode of each of the IGBTs 328 and 330 is inputted from the emitter electrode terminals 155 and 165 for monitoring of each arm to the corresponding drive unit IC (not shown in the figure). Based upon this, each of the drive unit ICs performs excess current detection, and, if it has detected excess current, stops the switching operation of the corresponding IGBT 328 or 330, thus protecting the corresponding IGBT 328 or 330 from excessive current. Furthermore, information about the temperatures of the upper and lower arm series circuits 150 is inputted to the microcomputer from temperature sensors (not shown in the figures) that are provided to the upper and lower arm series circuits 150. Yet further, information about the voltages at the DC positive electrode sides of the upper and lower arm series circuits 150 is inputted to the microcomputer. The microcomputer performs excess temperature detection and excess voltage detection on the basis of this information, and, if it detects excess temperature or excess voltage, stops the switching operation of all of the IGBTs 328 and 330, thus protecting the upper and lower arm series circuits 150, and also the semiconductor modules that includes these circuits 150, from excess temperature and excess voltage.

In a regenerative operation, where the motor-generator 192 is used as a generator, the operation of the IGBTs 328 and 330 of the upper and lower arms of the inverter circuit 144 is changed over in a fixed order, and the current in the fixed windings of the motor-generator 192 during this changeover flows in the circuits constituted by the diodes 156 and 166.

As shown in FIG. 2, the upper and lower arm series circuits 150 have: positive terminals (P terminals) 157, negative terminals (N terminals) 158, AC terminals 159 from the upper and lower arm intermediate electrodes 169, upper arm signal terminals (emitter electrode terminals for monitoring) 155, upper arm gate electrode terminals 154, lower arm signal terminals (emitter electrode terminals for monitoring) 165, and lower arm gate electrode terminals 164. Furthermore, the power conversion device 200 has the DC connector 138 at its input side and the AC connector 188 at its output side, and is connected to the battery 136 and the motor-generator 192 via the connectors 138 and 188, respectively. It should be understood that it would also be acceptable to provide power conversion devices having a circuit structure in which, for each phase, two upper and lower arm series circuits are connected in parallel, as circuits that output each phase of the three phase AC to be outputted to the motor-generator.

The battery 136 and the DC power supply smoothing capacitor 326 are connected together via a contactor 304. This contactor 304 is controlled by a signal 402 so as to be ON (closed) or OFF (open). Furthermore, a series circuit of a discharge resistor 324 and a switching element 325 is connected across the two ends of the capacitor 326. A discharge control circuit 300 controls the switching element 325 to ON and OFF, thus making the path for the discharge current from the capacitor 326 to the discharge resistor 324 continuous or discontinuous. In this case, however, the contactor 304 is turned off. It should be understood that while in this specification only one such discharge resistor 324 is shown, it would be acceptable to provide this discharge resistor 324 either as a single resistor, or as a set of low power resistors that are connected in parallel or in series or in series-parallel, and thus constitute a high capacity discharge resistor.

Figure 3:
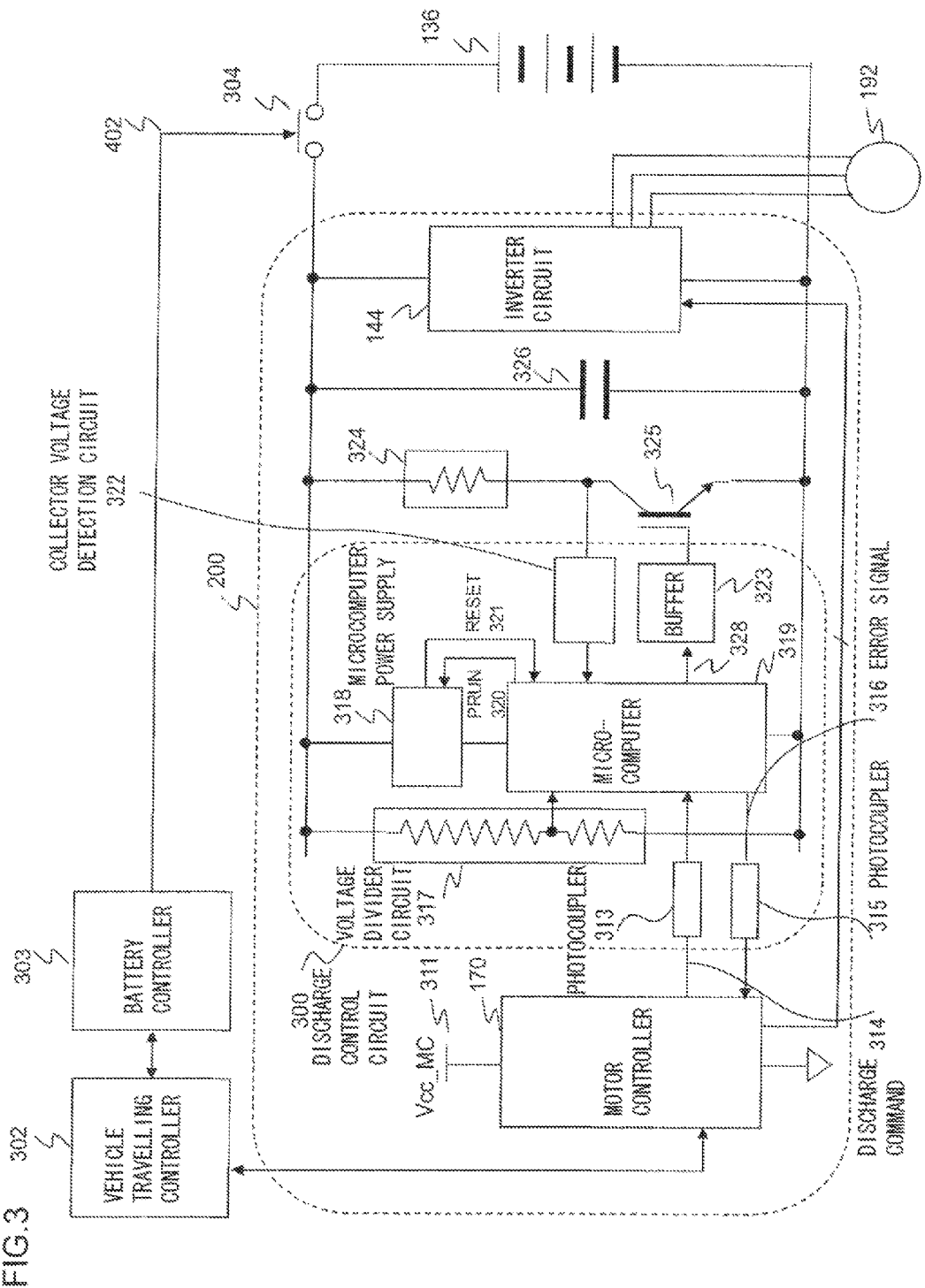
FIG. 3 is a figure showing the structure of a discharge control circuit 300 for a DC power supply smoothing capacitor 326, according to an embodiment of the present invention.

FIG. 3 shows the circuit structure of a discharge control circuit 300 for the DC power supply smoothing capacitor 326, according to the first embodiment of the present invention. In FIG. 3, the same reference symbols are affixed to elements that are the same as elements shown in FIGS. 1 and 2, and the explanation will concentrate upon specific aspects of the structure that are only shown in FIG. 3. The power conversion device 200 is connected to the battery 136 via the contactor 304. And the contactor 304 is controlled by a signal 402 from a battery controller 303. Moreover, the battery controller 303 is controlled by a higher level vehicle traveling controller 302. It should be understood that this higher level vehicle travelling controller 302 also controls the power conversion device 200 via the motor controller 170.

The discharge control circuit 300 comprises a microcomputer 319, a microcomputer power supply 318, photocouplers 313 and 315, a voltage divider circuit 317, a buffer 323, and a collector voltage detection circuit 322. The microcomputer power supply 318 supplies a power supply voltage of 5 V to the microcomputer 319 from a DC power supply (i.e. a DC link) of the power conversion device 200. Moreover, the microcomputer power supply 318 receives a PRUN signal 320 transmitted from the microcomputer 319. This PRUN signal 320 is a signal that means that the microcomputer 319 is operating normally. If the microcomputer power supply 318 detects from the PRUN signal 320 that the microcomputer 319 has ceased to operate normally, then the microcomputer power supply 318 transmits a RESET signal 321 to the microcomputer 319, thus resetting the microcomputer 319.

The photocoupler 313 transmits a discharge command signal 314 from the motor controller 170 to the microcomputer 319. And the photocoupler 315 transmits an error signal 316 from the microcomputer 319 to the motor controller 170. The voltage divider circuit 317 converts the high voltage of the DC power supply smoothing capacitor 326 to a voltage range that can be measured by a voltage measurement circuit (an A/D conversion circuit) of the microcomputer 319. And the buffer 323 amplifies a discharge control signal 328 outputted from the microcomputer 319 (that is at the 5 V level) to the gate operation signal level of the switching element 325 (i.e. to the 15 V level), and supplies it to the gate of the switching element 325. It should be understood that an example of a circuit for the buffer 323 will be described hereinafter.

The collector voltage detection circuit 322 detects whether the collector voltage of the switching element 325 is high or low, and transmits the result to the microcomputer 319. Here if the collector voltage is high the switching element 325 is in the OFF (interrupted) state, whereas if the collector voltage is low the switching element 325 is in the ON (continuous) state. It should be understood that an example of a circuit for the collector voltage detection circuit 322 will be described hereinafter. The microcomputer 319 receives the discharge command signal 314 from the motor controller 170 via the photocoupler 313, and outputs the discharge control signal 328 for controlling the switching element 325. Moreover, the microcomputer 319 measures the terminal voltage across the DC power supply smoothing capacitor 326 via the voltage divider circuit 317, and terminates discharge operation when the terminal voltage across the capacitor 326 drops down to a final target voltage for discharge. Moreover, the microcomputer 319 checks whether or not the switching element 325 is operating normally by detecting with the collector voltage detection circuit 322 whether the switching element 325 is in the ON state or the OFF state, and outputs an error signal 316 if erroneous operation has taken place. It should be understood that it would also be acceptable to arrange to provide a warning lamp such as an LED to the chassis of the inverter, and to illuminate that lamp if erroneous operation is taking place, or if discharge has not been completed.

Figure 14:
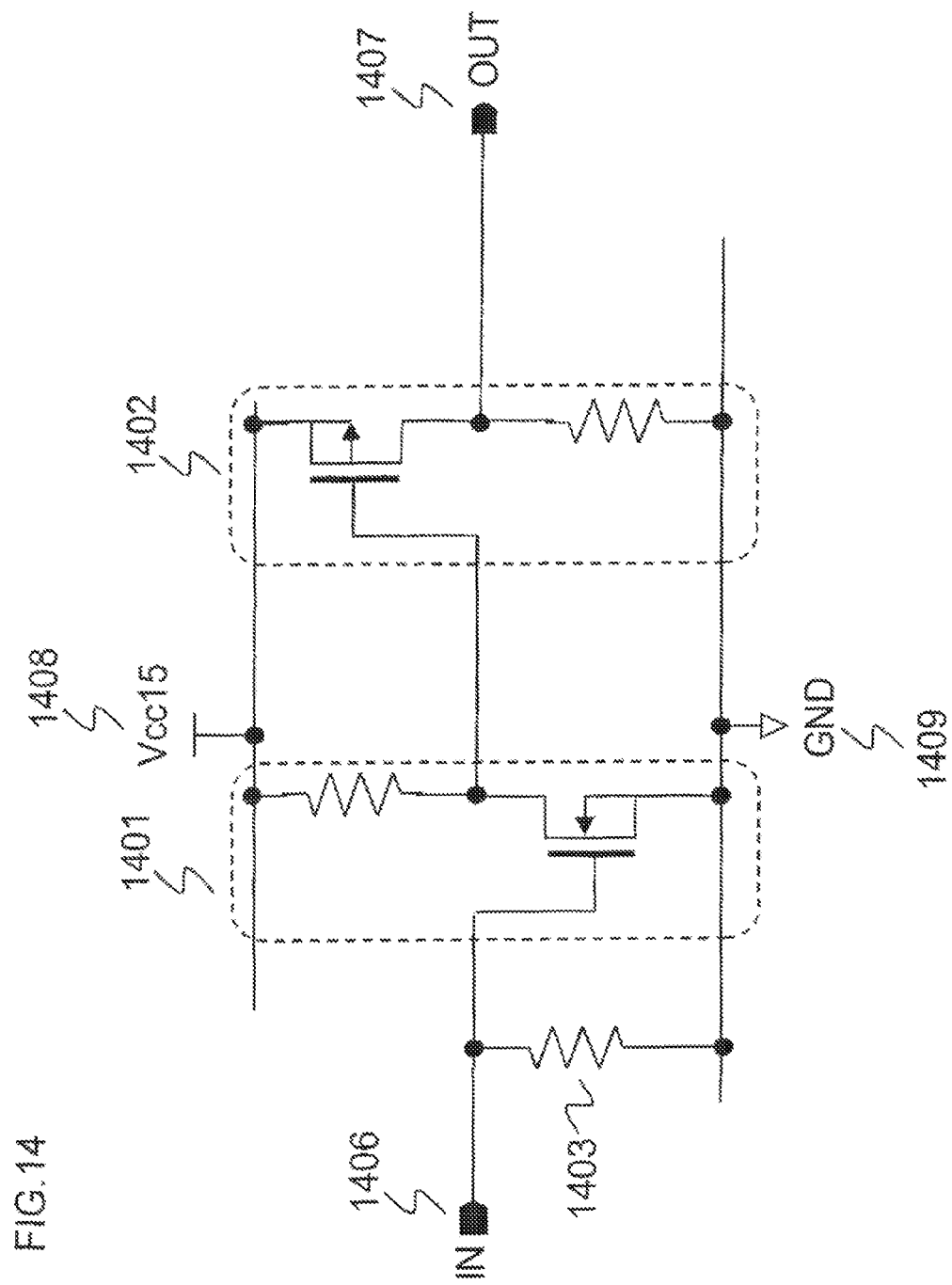
FIG. 14 is a circuit diagram for the interior of a buffer 323 of the discharge control circuit 300.

FIG. 14 is a circuit diagram showing the interior of the buffer 323 of the discharge control circuit 300. This buffer 323 includes an NMOS inverter gate circuit 1401, a PMOS inverter gate circuit 1402, and a pull down resistor 1403. An input terminal 1406 is connected to the input of this NMOS inverter gate circuit 1401. Moreover, the output of the NMOS inverter gate circuit 1401 is connected to the input of the PMOS inverter gate circuit 1402. And the output of the PMOS inverter gate circuit 1402 is connected to an output terminal 1407. A 15 V power supply 1408 (Vcc15) is connected to both of the inverter gate circuits and provides operating power thereto. Here, the gate voltage threshold value VGS (th) of the NMOS of the NMOS inverter gate circuit 1401 is around 2.5 V.

Since these two inverter gate circuits are connected in two stages in the buffer 323 in this manner, the logic of the input and the output are the same, but the logic threshold value of the NMOS inverter gate circuit 1401 is around 2.5 V, and can convert a signal at the 5 V level to a signal at the 15 V level. Furthermore, the pull down resistor 1403 is connected between the input of the NMOS inverter gate circuit 1401 and ground 1409, so that the input of the NMOS inverter gate circuit 1401 is kept at low level even if the input terminal 1406 becomes high impedance. Due to this, the buffer 323 outputs low level even if its input has become high impedance due to some fault in the input circuit to the buffer 323, and thereby the switching element 325 is switched off, so that the buffer does not go into the discharge state.

Figure 15:
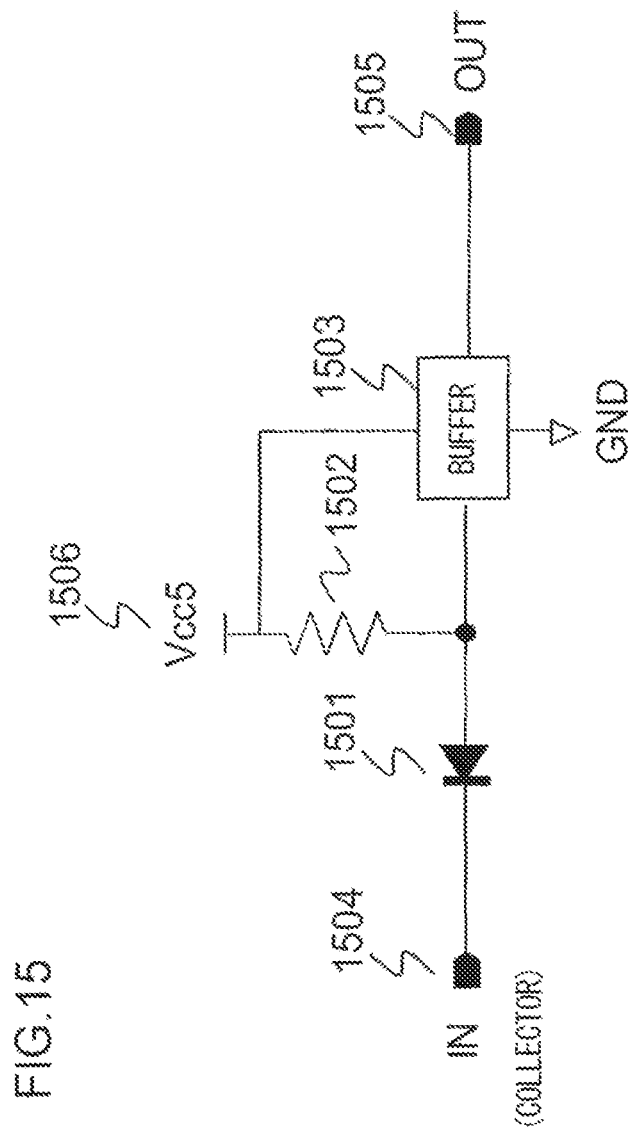
FIG. 15 is a circuit diagram for the interior of a collector voltage detection circuit 322 of the discharge control circuit 300.

FIG. 15 is a circuit diagram showing the interior of the collector voltage detection circuit 322 of the discharge control circuit 300. This collector voltage detection circuit 322 includes a high withstand voltage diode 1501, a pull up resistor 1502, and a buffer 1503. The collector of the switching element 325 is connected to an input terminal 1504. The cathode of the high withstand voltage diode 1501 is connected to this input terminal 1504, and its anode is connected to the input terminal of the buffer 1503. Moreover, the anode of the high withstand voltage diode 1501 is connected to a 5 V power supply 1506 (Vcc5) via the pull up resistor 1502. Furthermore, the output of the buffer 1503 is connected to an output terminal 1505, and the power supply of the buffer 1503 is connected to the 5 V power supply 1506 (Vcc5).

The collector of the switching element 325 is connected to the positive electrode of the DC power supply smoothing capacitor 326 via the discharge resistor 324, and, when the switching element 325 is OFF, it is normally at a high voltage of 300 V or more. At this time, since the cathode potential of the high withstand voltage diode 1501 is 300 V or more, and its anode potential is 5 V, i.e. is the same as the potential of the 5 V power supply 1506, accordingly the high withstand voltage diode 1501 is in the reverse bias state and is OFF. Since this is so, the input of the buffer 1503 is 5 V, in other words is high level, and thus high level is outputted at its output terminal 1505. On the other hand, when the switching element 324 is ON, the collector of the switching element 325 is at around 0 to 1V. At this time, since the cathode potential of the high withstand voltage diode 1501 is around 0 to 1 V, and also its anode potential is 5 V, i.e. is the same as the potential of the 5 V power supply 1506, accordingly the high withstand voltage diode 1501 is in the forward bias state, and is ON. Since this is so, the input of the buffer 1503 is low level, and thus low level is outputted at its output terminal 1505.

Figure 4:
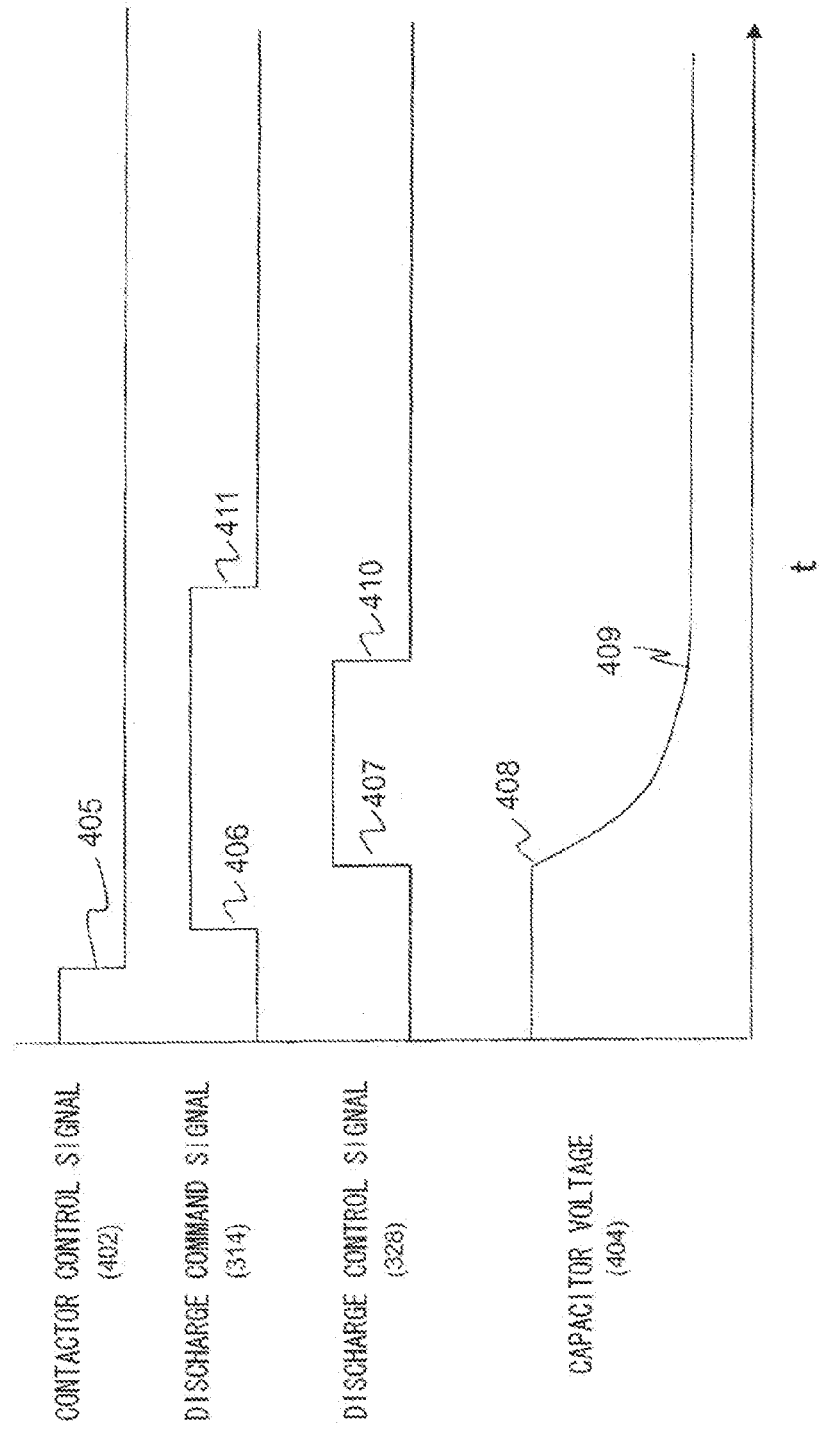
FIG. 4 is a timing chart showing the operation of various sections of this discharge control circuit 300, when normal discharge has been performed.

FIG. 4 is a timing chart showing the operation of various sections of this discharge control circuit 300 when normal discharge is performed. Here, the discharge command signal 314 being at high level corresponds to discharge. First at the time point 405, before discharge, the vehicle traveling controller 302 changes the contactor control signal 402 from high level to low level via the battery controller 303. Due to this, the contactor 304 goes from ON (closed) to OFF (open). Then at the next time point 406, when the vehicle traveling controller 302 outputs a discharge command signal to the motor controller 170, the motor controller 170 changes the discharge command signal 314 to the discharge control circuit 300 from low level to high level. Next at the time point 407, when the microcomputer 319 changes the discharge control signal 328 from low level to high level, the switching element 325 goes into the ON state (continuous) and discharge of the DC power supply smoothing capacitor 326 by the resistor 324 is started, and the voltage of the DC power supply smoothing capacitor 326 starts to decrease from the time point 408. And, after the voltage across the capacitor 326 drops to the target discharge voltage at the time point 409, at the time point 410 the microcomputer 319 changes the discharge control signal 328 from high level to low level, and the discharge is terminated. Subsequently at the time point 411 the motor controller 170 changes the discharge command signal 314 from high level to low level, and discharge is completed.

It should be noted that the time points 407 and 408 are slightly different, because the protection operation, which is explained later, is executed.

Although, with the timing chart shown in FIG. 4, the discharge command signal 314 has been explained as being at low level in the normal state (the state in which discharge is prevented), and as being at high level during discharge, it would also be acceptable to arrange to drive the switching element 325 by the microcomputer 319 via a duty ratio signal, and, for example, for the microcomputer 319 to produce a PWM signal of duty ratio 25% in the normal state (the state in which discharge is prevented), while controlling the switching element 325 with a PWM signal of duty ratio 75% during discharge.

Figure 5:
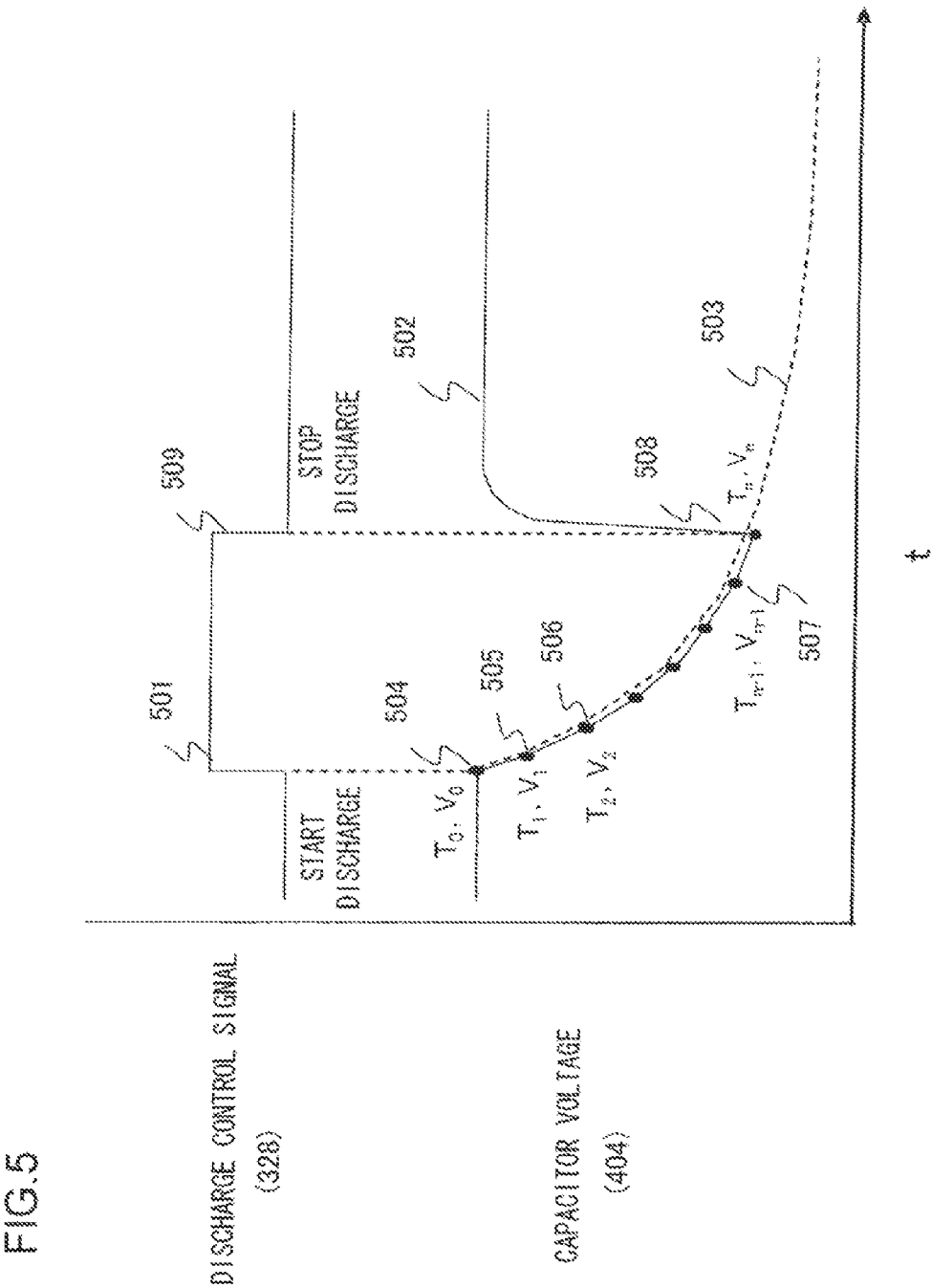
FIG. 5 is a timing chart showing protection operation by the discharge control circuit 300, when for some reason a contactor 304 has gone to ON (closed) during discharge.

FIG. 5 is a timing chart showing protection operation by the discharge control circuit 300 when, for some reason, the contactor 304 goes to ON (closed) during discharge. When the discharge command signal 314 outputted from the motor controller 170 to the discharge control circuit 300 goes to high level at the time point 501 in FIG. 5, the microcomputer 319 changes the discharge control signal 328 from low level to high level, and discharge is started. If this discharge start time point is termed $T_o$, then the voltage across the DC power supply smoothing capacitor 326 starts to decrease from its initial value $V_0$ from the time point 504. The microcomputer 319 measures the voltage of the capacitor 326 at fixed intervals, i.e. as being $V_1, V_2, \ldots V_{n-1}$ at the time points $T_1, T_2, \ldots T_{n-1}$, and compares these with the voltage decrease characteristic 503 of the capacitor 326 with respect to discharge time (shown by the broken line in FIG. 5). When at the time point $T_n$ the contactor 304 goes to ON, the voltage of the capacitor 326 abruptly rises from $V_n$, and rises to be substantially above the voltage decrease characteristic 503. At this time, the microcomputer 319 decides that a discharge fault has occurred because, even though discharge is still taking place, the voltage of the capacitor 326 has risen to be substantially higher than the voltage decrease characteristic 503, and accordingly the microcomputer 319 changes the discharge control signal 328 from high level to low level at the time point 509, thus stopping discharge.

It should be noted that the time points T0 and 504 are slightly different, because the protection operation, which is explained later, is executed.

Here, the voltage decrease characteristic 503 shown in FIG. 5 is a characteristic curve that specifies decrease of the voltage the DC power smoothing capacitor 326 with respect to discharge time when the capacitor is discharged via the discharge resistor 324, and, as the discharge time period becomes longer, the capacitor voltage decreases as an exponential function of time. This voltage decrease characteristic 503 may be obtained by calculation on the basis of the capacitance value C of the capacitor 326 and the resistance value R of the discharge resistor 324, but it is desirable for it to be calculated while taking into consideration the internal resistances of the capacitor 326 and the switching element 325, or to be actually measured.

Figure 6:
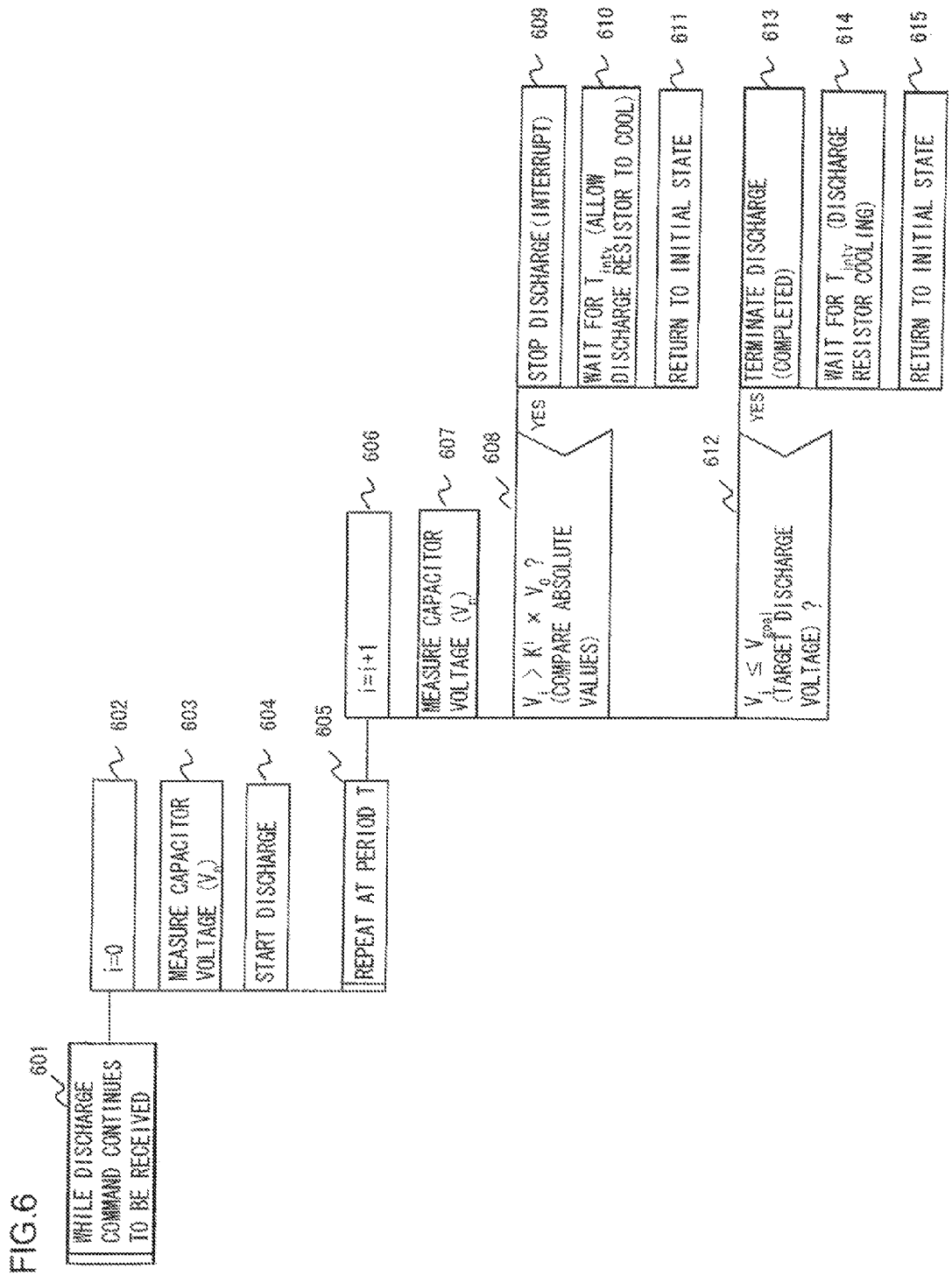
FIG. 6 is a PAD showing protection operation performed by a microcomputer 319 of the discharge control circuit 300.

FIG. 6 is a PAD (Problem Analysis Diagram) showing this protection operation by the microcomputer 319 of the discharge control circuit 300. In a first step 601, upon receipt of a discharge command signal 314 from the motor controller 170, the discharge control circuit 300 starts this protection operation, and thereafter repeatedly executes this protection operation at a predetermined period T while the discharge command signal 314 continues to be received. First, in a step S602, a counter i that counts the number of times this protection operation has been repeated is reset to 0. Since the protection operation is repeated at the period T while the discharge command signal 314 is being received, the total time period of discharge is (i·T). After next in a step 603 the initial voltage $V_0$ of the DC power supply smoothing capacitor 326 has been measured, in a step 604 the discharge control signal 328 is brought to high level so that the switching element 325 is turned ON, so that discharge starts.

In the next step 605, the processing of steps 606 through 615 is repeated at the period T. First in the step 606 after the period T the counter i is incremented, and then in a step 607 the voltage $V_i$ of the capacitor 326 at the time point $T_i$ is measured. Then in a step 608, as shown in FIG. 5, a decision is made as to whether or not the voltage $V_i$ of the capacitor 326 at the time point $T_i$ is substantially above the voltage decrease characteristic 503, according to the following Equation:

$$V_i > K^i V_0 \quad (1)$$

In Equation (1), "^" means exponentiation. Furthermore, K is a coefficient that determines the voltage decrease characteristic at the time point T, and is given by K≈exp(−T/RC) if the resistance value of the discharge resistor 324 is termed R and the capacitance of the capacitor 326 is termed C. Exp(−T/RC) is the ratio of the capacitor voltage $V_i$ to the initial voltage V0, when the charge accumulated in a capacitor of capacitance value C has been discharged through a resistor of resistance value R for the discharge time T. In other words, if the capacitor voltage after the discharge time period $T_i$ when charge accumulated in a capacitor of capacitance value C has been discharged via a resistor of resistance value R is termed $V_{ideal}$, then $V_{ideal}(T_i) \leq K^i \cdot V0$.

It should be understood that it is desirable for the actual K in the step 608 to be set to K≥exp(−T/RC), in consideration of errors in voltage measurement by the microcomputer 319. Furthermore, it is not necessary to perform the exponentiation calculation for (K^i) each time; if instead the result (K^(i−1)) the previous time is stored and this is multiplied by K, then it is possible to economize upon calculation. Yet further, although in the example shown above it is determined according to Equation (1) whether or not the capacitor voltage $V_i$ at the time point $T_i$ is substantially greater than the voltage decrease characteristic 503, it would also be acceptable to arrange to store in advance a characteristic curve like the voltage decrease characteristic 503 shown by the broken line in FIG. 5, and to compare the voltage decrease characteristic at the time point $T_i$ with the measured value $V_i$ that is read out.

Now, if for some reason during discharge the contactor 304 goes to ON, then, since the terminal voltage of the battery 136 comes to be applied between the two ends of the DC power supply smoothing capacitor 326, the voltage across the capacitor $V_i$ will increase abruptly, and $V_i$ will become $>K^i \cdot V_0$. Thus, if the decision equation (1) of the step 608 is satisfied, then the flow of control proceeds to a step 609, and the discharge control signal 328 is put to low level so that the switching element 325 is turned OFF, and discharge is stopped (interrupted). And then in a step 610 the system is inactive for a predetermined time period $T_{intv}$. This inactive time period is a time period for waiting until the temperature of the discharge resistor 324 decreases sufficiently. After this inactive time period $T_{intv}$ has elapsed, the system returns to its initial state in a step 611.

If the decision equation (1) in the step 608 is not satisfied, in other words if at the time point $T_i$ the capacitor voltage $V_i$ is less than or equal to the voltage decrease characteristic $(K^i \cdot V_0)$, then it is decided that the contactor 304 is still OFF, and discharge is continued. In this case the flow of control proceeds to a step 612, in which a decision is made as to whether or not the voltage $V_i$ across the capacitor has reached a target discharge voltage that is set in advance, and if it has reached the target discharge voltage then the flow of control proceeds to a step 613, in which the discharge control signal 328 is brought to low level and the switching element 325 is turned OFF, so that discharge is stopped (i.e., discharge is completed). Thereafter, the system waits for a predetermined inactive time period $T_{intv}$ in the step 614. This inactive time period is a time period for waiting until the temperature of the discharge resistor 324 decreases sufficiently. After this inactive time period $T_{intv}$ has elapsed, the system returns to its initial state in a step 614.

Figure 7:
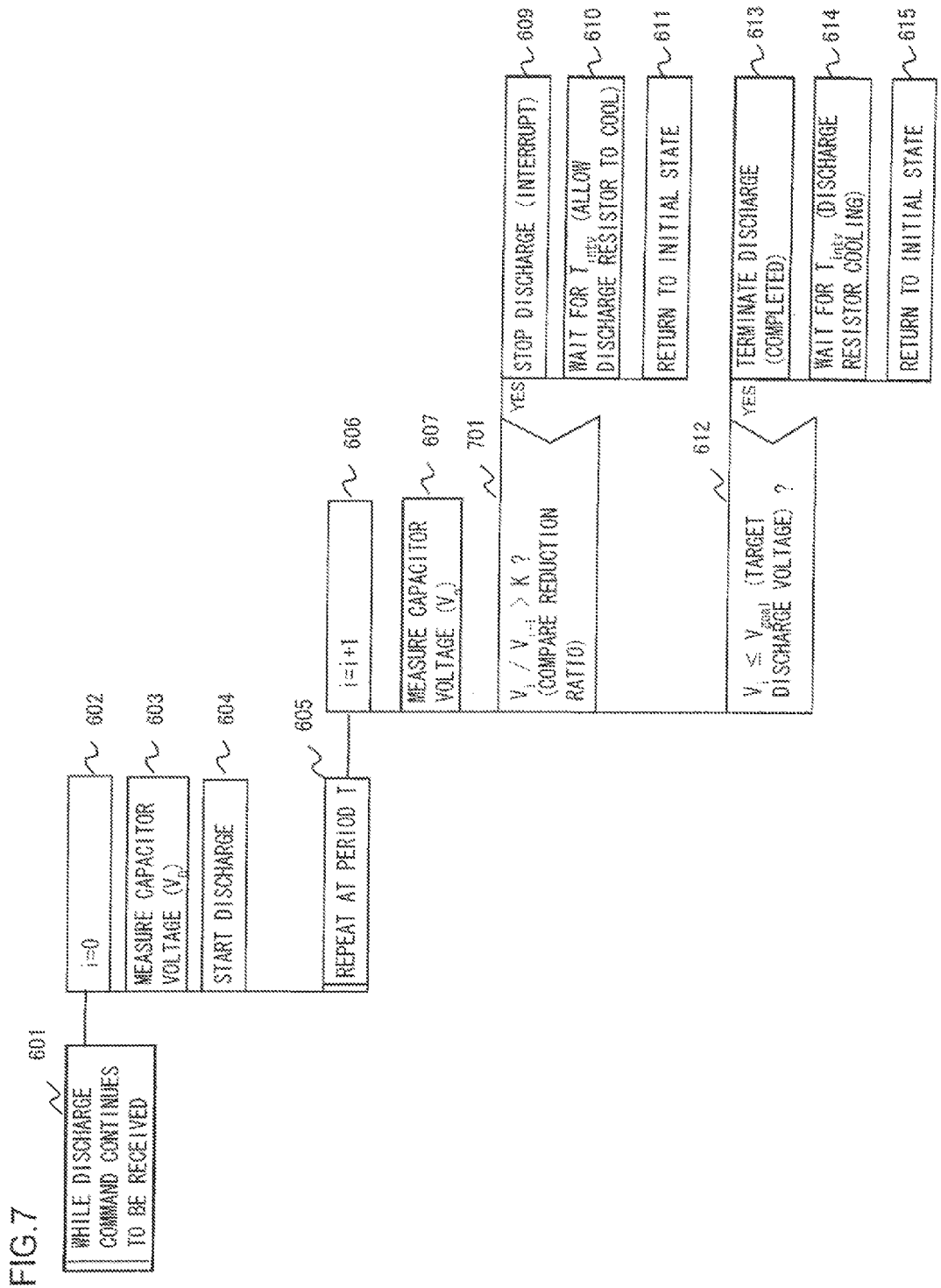
FIG. 7 is a PAD showing a variant embodiment of the protection operation shown in FIG. 6.

Instead of the decision equation (1) in the step 608 of FIG. 6, it would also be acceptable to determine whether or not, at the time point $T_i$, the voltage $V_i$ of the capacitor exceeds the voltage decrease characteristic, according to this decision equation (2) as shown in the step 701 of FIG. 7:

$$V_i / V_{i-1} > K \quad (2)$$

In Equation (2), Vi is the measured value of the capacitor voltage at the time point $T_i$, and $V_{i-1}$ is the measured value of the capacitor voltage at the time point $T_{i-1}$. Moreover, K is a coefficient that determines the voltage decrease characteristic at the time point T, and is given by K≈exp(−T/RC) if the resistance value of the discharge resistor 324 is termed R and the capacitance of the capacitor 326 is termed C. If the result of the decision according to Equation (2) is affirmative, then it is decided that for some reason the contactor 304 is ON, and discharge is stopped. It should be understood that, except for the step 701, the processing of FIG. 7 is identical to that shown in FIG. 6 and described above, and accordingly explanation thereof will be omitted.

It should be noted that the system operation in the step 611 or 615 of FIGS. 6 and 7 is assumed to return to the initial state. Actually, as a discharge stop command is issued in the step 609 or 613, the microcomputer 319 inhibits discharging for the period $T_{intv}$, the system operation returns to the main routine (not shown) that calls the subroutine of protective operation shown in FIG. 6 or 7. Then, after waiting the time $T_{intv}$, the operation in the step 601 is restarted.

Figure 8:
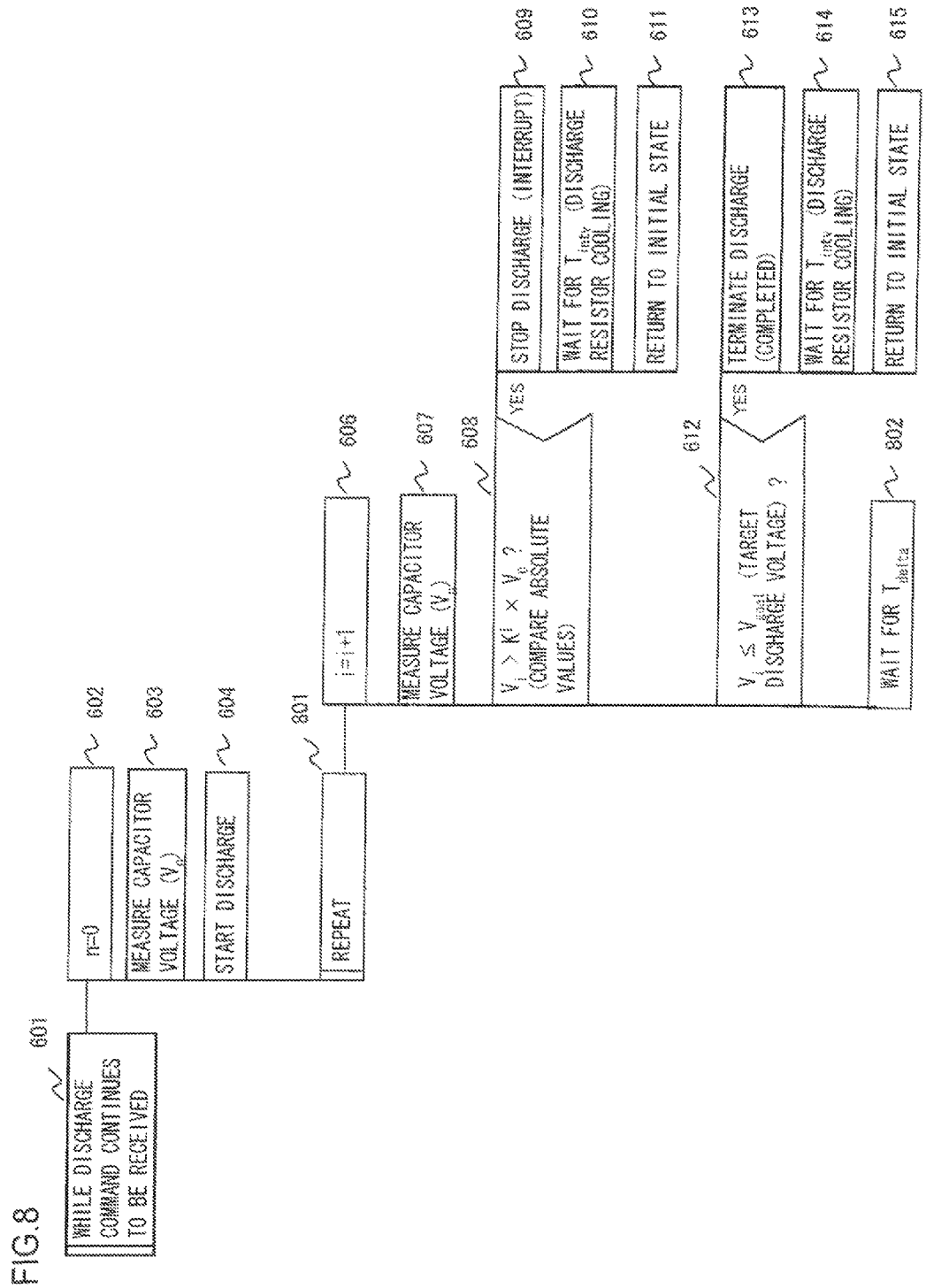
FIG. 8 is a PAD showing another variant embodiment of the protection operation by the microcomputer 319 of the discharge control circuit 300.

Now, inevitably there are errors in the measurement of voltage by the microcomputer 319, and the smaller is the measured voltage, the greater the influence of such errors becomes. Thus, a protection operation will now be explained in which it is arranged for the measurement time interval to be made longer, the smaller the voltage across the capacitor becomes, so that the change of the capacitor voltage becomes greater than the measurement error. FIG. 8 is a PAD showing another embodiment of the protection operation by the microcomputer 319 of the discharge control circuit 300. In FIG. 8, to steps that perform the same processing as steps shown in FIG. 6, the same reference symbols are appended, and the explanation will focus upon the points of difference. With the protection operation shown in FIG. 6, the voltage $V_i$ of the DC power supply smoothing capacitor 326 was measured at fixed time intervals T; but, by contrast, with the protection operation shown in FIG. 8, the interval between the time points at which measurement of the capacitor voltage is performed is made to be longer as the voltage of the capacitor becomes progressively lower due to discharge. Thus, in this protection operation, the measurement interval for the capacitor voltage $V_i$ is changed from T to $T_{delta}$.

If the time interval over which the difference between the capacitor voltage the previous time and its voltage this time becomes equal to the measurement error $V_{error}$ is termed $T_{delta}$, then:

$$V_{error}=V_{i+1}-V_i=V_0(\exp(-(T_i+T_{delta})/RC)-\exp(-T_i/RC)) \quad (3)$$

And, solving this equation, $T_{delta}$ is obtained as follows:

$$T_{delta}=-RC\cdot\ln(\exp(-T_i/RC)-V_{error}/V_0) \quad (4)$$

In Equation (3), ln means the natural logarithm, and $V_{error}$ is the measurement error. Thus, in the step 801 of FIG. 8 that replaces the step 605 of FIG. 6, the subsequent decision processing is repeated without attention to any time interval, while an additional step 802 is provided after the step 612, in which the system waits for the time interval $T_{delta}$.

Figure 9:
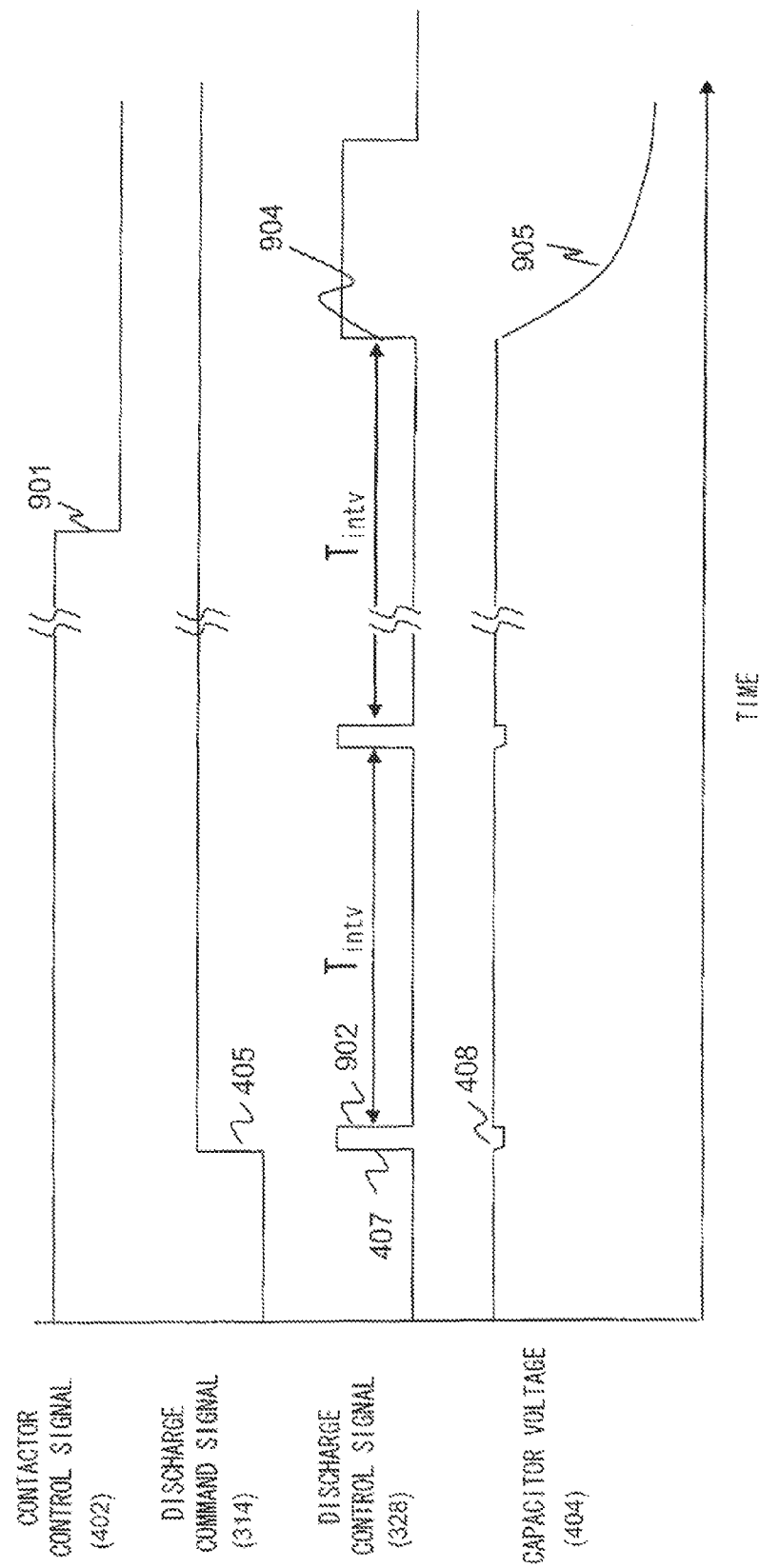
FIG. 9 is a timing chart showing the discharge protection operation, when the contactor 304 stays in the ON (closed) state when a discharge command signal is received.

FIG. 9 is a timing chart showing the discharge protection operation if, after the discharge command signal has been received, the contactor 304 stays in the ON (closed) state. At a time point 405, the discharge command signal 314 goes from low level to high level, and shortly afterwards at the time point 407 the discharge control signal 328 is brought to high level and the protective operation for starting discharge as shown in FIG. 6 is started, but the contactor control signal 402 stays at high level (ON), so that the contactor 304 stays ON (i.e. closed). As described above, when the contactor 304 is closed during discharge, the voltage of the DC power supply smoothing capacitor 326 does not decrease as it does under normal conditions (at the time point 408), and, since it is higher than the voltage decrease characteristic 503 shown in FIG. 5, at the time point 902 the microcomputer 319 returns the discharge control signal 328 from high level to low level, and thereby stops discharge.

Subsequently, after the system has been inactive during the time period $T_{intv}$, the processing is restarted at the time point that the discharge command signal 314 was received, and, since the discharge command signal 314 is still at high level, accordingly the discharge control signal 328 is brought to high level for a second time, and the protective operation for starting discharge as shown in FIG. 6 is started. However, since the contactor 304 remains closed, the capacitor voltage does not decrease, and, since for a second time the capacitor voltage comes to exceed the voltage decrease characteristic 503, the discharge control signal 328 is returned from high level back to low level, and discharge is stopped in a similar manner to the previous time. This operation is repeated as long as the contactor 304 remains closed. Supposing that at the time point 901 during one of these inactive time periods $T_{intv}$, the contactor control signal 402 goes to low level and the contactor 304 goes to OFF (open): then, when this inactive time period $T_{intv}$ ends at the time point 904, the capacitor voltage decreases in a normal manner (at 905), and discharge is completed normally.

Figure 10:
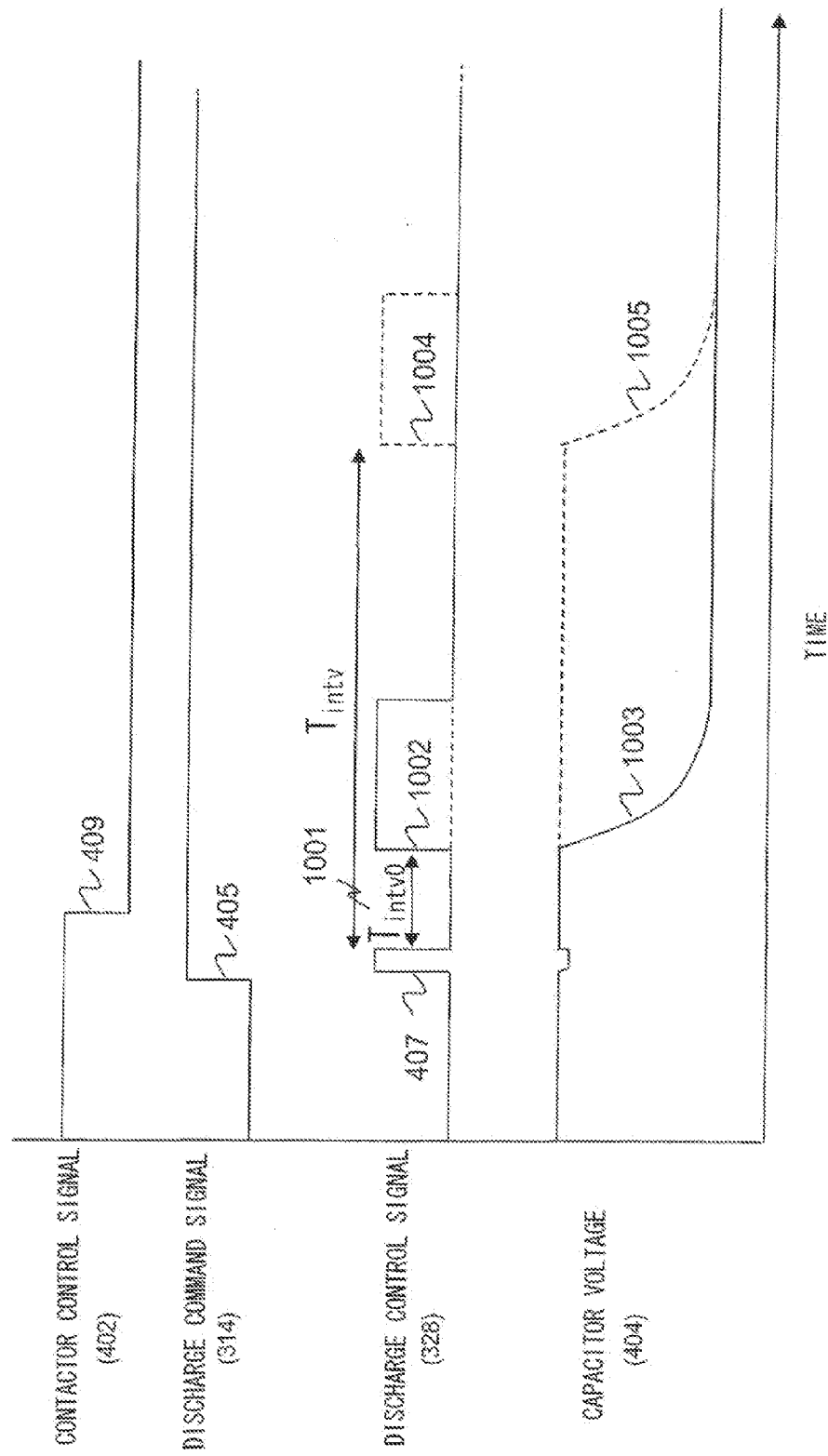
FIG. 10 is a timing chart showing another embodiment of the discharge protection operation, when the contactor 304 stays in the ON (closed) state when a discharge command signal is received.

FIG. 10 is a timing chart showing another embodiment of the discharge protection operation in case that the contactor 304 is in closed state when the discharge command signal has been received. It is supposed that even though the system is functioning normally, the contactor control signal 402 is delayed somewhat with respect to the discharge command signal 314. Since, in this type of situation, with the discharge protection operation shown in FIG. 9, after the first attempt at discharge has been stopped due to a decision that a fault has occurred, and the system has been inactive during the time period $T_{intv}$, discharge can be performed in a normal manner upon the second attempt at discharge, accordingly the time period from when the discharge command signal 314 is first issued to when the discharge is completed is increased by the inactive time period $T_{intv}$ or more.

However, in terms of the basic function of the discharge circuit, it is desirable for the time period from when the discharge command signal 314 is first issued to when the discharge is completed to be as short as practicable. Thus, with the discharge protection operation shown in FIG. 10, the inactive time period for the first time that discharge is attempted is set to an inactive time period $T_{intv0}$ that is shorter than the above mentioned inactive time period $T_{intv}$. Accordingly, in the discharge protection operation shown in FIG. 10, at a time point 405, the discharge command signal 314 goes from low level to high level, and shortly afterwards at the time point 407 the discharge control signal 328 is also brought from low level to high level, but it is supposed that the contactor control signal 402 stays at high level (ON), so that discharge stops. However if, at the time point 409 directly afterwards, the contactor control signal 402 goes from high level to low level, in the discharge protection operation shown in FIG. 9, the discharge control signal 328 would be outputted at the time point 1004 that is later by the inactive time period $T_{intv}$, as shown by the broken line in FIG. 10, and discharge would start and the capacitor voltage would decrease as shown by the broken line 1005. By contrast, with the discharge protection operation shown in FIG. 10, the discharge control signal 328 is outputted at the time point 1002 that is later by only the short inactive time period Tintv0, and consequently the discharge process starts and the capacitor voltage decreases as shown by the solid line 1003. In other words, with the discharge protection operation shown in FIG. 10, it is possible to start the second attempt at discharge more quickly than in the case of the discharge protection operation shown in FIG. 9, and it is accordingly possible to complete the discharge more quickly.

In actual practice, with a system in which the capacitance C of the DC power supply smoothing capacitor 326 is 2000 µF, the value R of the resistance of the discharge resistor 324 is 400Ω, the coefficient K is 0.9, the initial discharge voltage $V_0$ is 300 V, the target discharge voltage $V_{goal}$ is ±50 V, and the voltage measurement error $V_{error}$ is 5 V, for example, the inactive time period $T_{intv}$ may be set to 10 seconds, and the inactive time period $T_{intv0}$ may be set to 1 second.

Since, as has been explained above, even if the contactor 304 is closed during discharge, the discharge process is stopped, accordingly current does not continue to flow in the discharge resistor 324, and it is possible to protect against damage to the discharge circuit.

Figure 11:
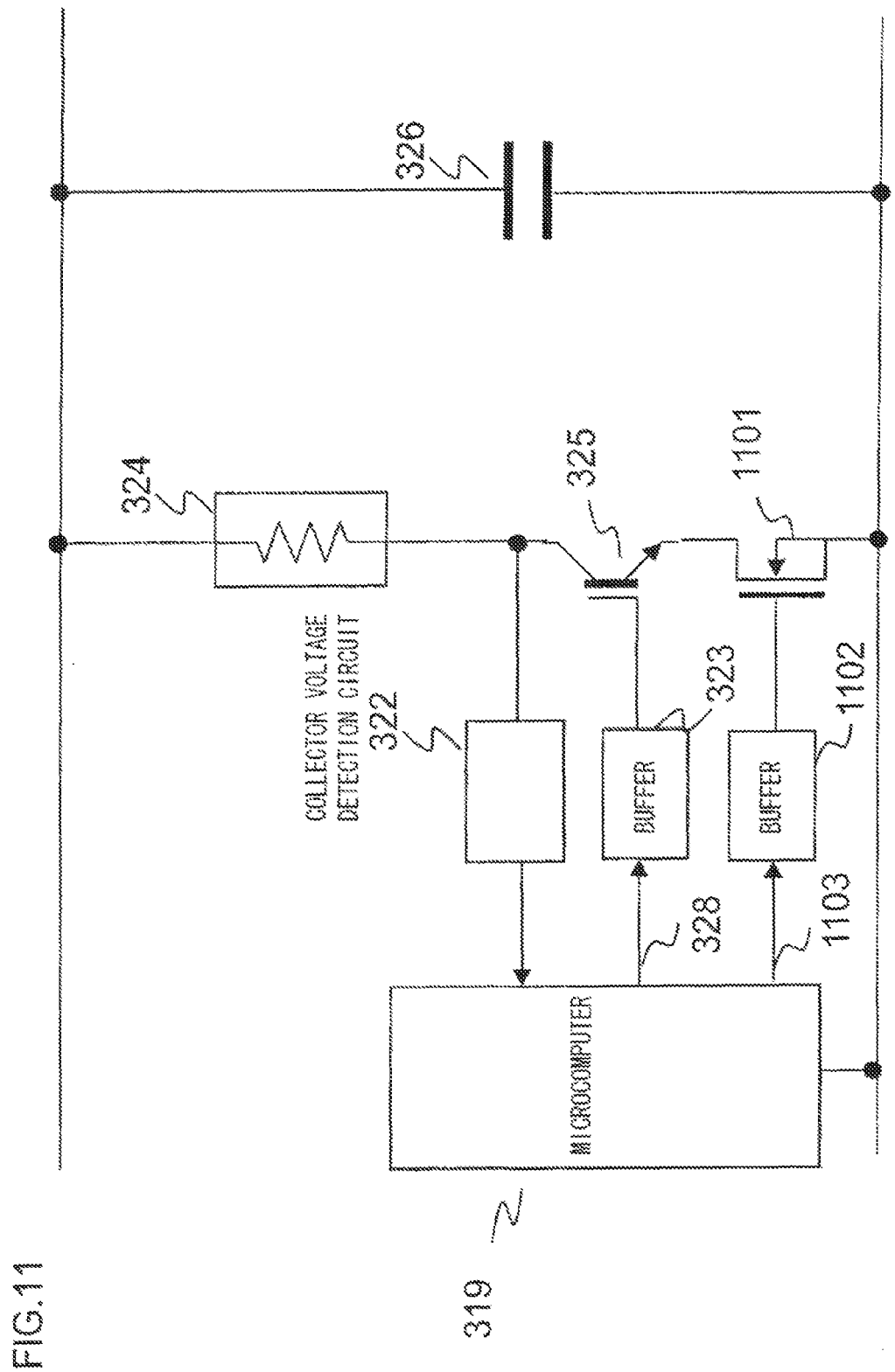
FIG. 11 is a circuit diagram of a discharge circuit according to another embodiment, in which a second switching element 1101 is connected in series with a switching element 325, and performs backup if the first switching element 325 experiences a short-circuiting type fault.

Although if, during the discharge of the charge stored in the DC power supply smoothing capacitor 326 via the discharge resistor 324, an anomaly such as the contactor 304 going to closed or the like occurs, then the discharge is stopped by the switching element 325 being set to OFF. On the other hand, if a short-circuiting type fault occurs in the switching element 325 itself so that it cannot be turned to OFF, then a discharge current will continue to flow via the discharge resistor 324. In order to cope with this, as shown in FIG. 11, a second switching element 1101 is connected in series with the first switching element 325, and this second switching element 1101 performs backup for the first switching element 325 in the event that it should suffer a short-circuiting type fault. It should be understood that, in FIG. 11, only the portions within the discharge control circuit 300 shown in FIG. 3 are shown that have some relationship with the specific characteristics of this embodiment. In this embodiment a MOSFET, that serves as the second switching element 1101, is connected in series between the emitter and the ground of the switching element 325 of the discharge control circuit 300 shown in FIG. 3. Moreover, a control signal 1103 is outputted from the microcomputer 319 to turn this second switching element 1101 ON and OFF, and this signal 1103 controls the second switching element 1101 via a buffer 1102.

Normally, the control signal 1103 from the microcomputer 319 is outputted so as to keep the second switching element 1101 in the ON state. However when it is necessary to stop discharge, if it is not possible to do so due to the first switching element 325 experiencing a short-circuiting type fault, then the discharge is stopped by turning the second switching element 1101 to OFF. It should be understood that if the first switching element 325 experiences a short-circuiting type fault, the microcomputer 319 is able to sense this due to the operation of the collector voltage detection circuit 322. If the collector voltage detection circuit 322 is transmitting low level while the microcomputer 319 is outputting a control signal 328 to turn the first switching element 325 OFF, then it is understood that the first switching element 325 is remaining in the ON state, in other words that it is experiencing a short-circuiting type fault.

Since, in this manner, it is still possible reliably to stop the discharge using the second switching element 1101 even if the first switching element 325 experiences a short-circuiting type fault, accordingly even if for some reason the contactor 304 should become ON (closed) during discharge, it is still possible to prevent current continuing to flow in the discharge resistor 324, and it is possible to protect the discharge circuit from damage.

Generally, when discharging electric charge held in a capacitor of capacitance C with a discharge resistor whose resistance value is R, the voltage V of the capacitor decreases with the time constant RC. In other words, the voltage V during discharge at time t is given by:

$$V = V_0 \exp(-t/RC) \quad (6)$$

Here, the tendency of the voltage V to decline becomes more gradual over time, the lower the voltage V becomes. In other words, the efficiency with respect to time at which the voltage V decreases becomes worse the lower the voltage V becomes, so that the discharge time period becomes extended.

Figure 12:
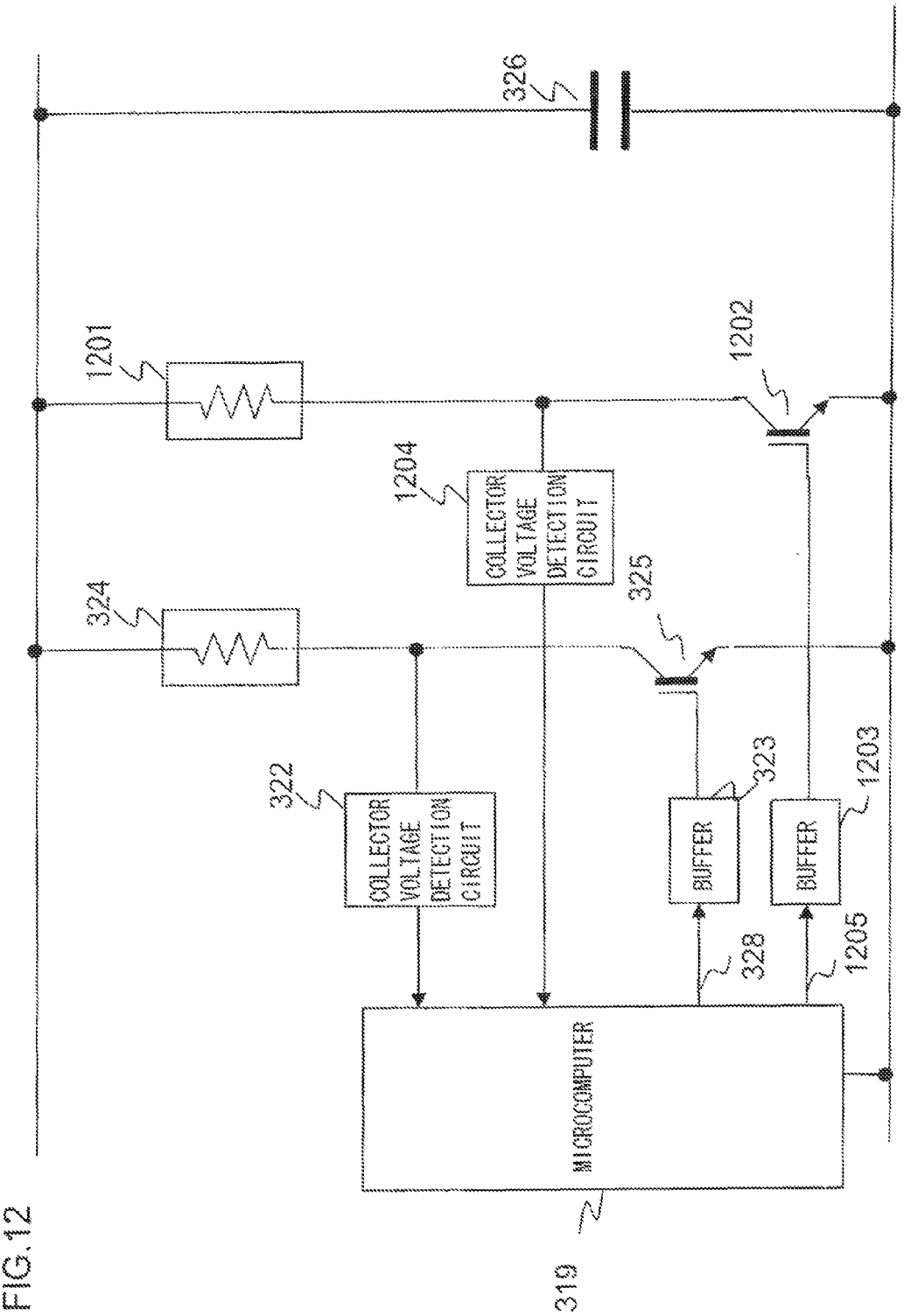
FIG. 12 is a circuit diagram of a discharge circuit according to another embodiment, in which it is arranged to shorten the discharge period by lowering the resistance value of a discharge resistor when the tendency of the voltage V to decline has become more gradual over time.

Therefore, an embodiment will be explained in which it is arranged to shorten the discharge time period by lowering the resistance value of the discharge resistor as the tendency of the voltage V to decline becomes more gradual. FIG. 12 shows a discharge circuit according to this embodiment. It should be understood that, in FIG. 12, only the portions within the discharge control circuit 300 shown in FIG. 3 are shown that have some relationship with the specific characteristics of this embodiment. In this embodiment, to the discharge control circuit 300 shown in FIG. 3, there are further added a second discharge resistor 1201, a second switching element 1202, a second buffer 1203, and a second collector voltage detection circuit 1204. While the operation of this second discharge device is the same as that of the first discharge device that includes the first discharge resistor 324, the first switching element 325, and the first buffer 323, it receives control by the microcomputer 319 separately and independently from the first discharge device. It is desirable for the resistance value R2 of the second discharge resistor 1201 to be around $$R2 = \{(V_{max} + V_{goal})/2 \cdot V_{max}\}^2 \cdot R1 \quad (7)$$

Thus, this value is lower than the resistance value R1 of the first discharge resistor 324. It should be understood that, in Equation (7), Vmax is the highest voltage during discharge.

Figure 13:
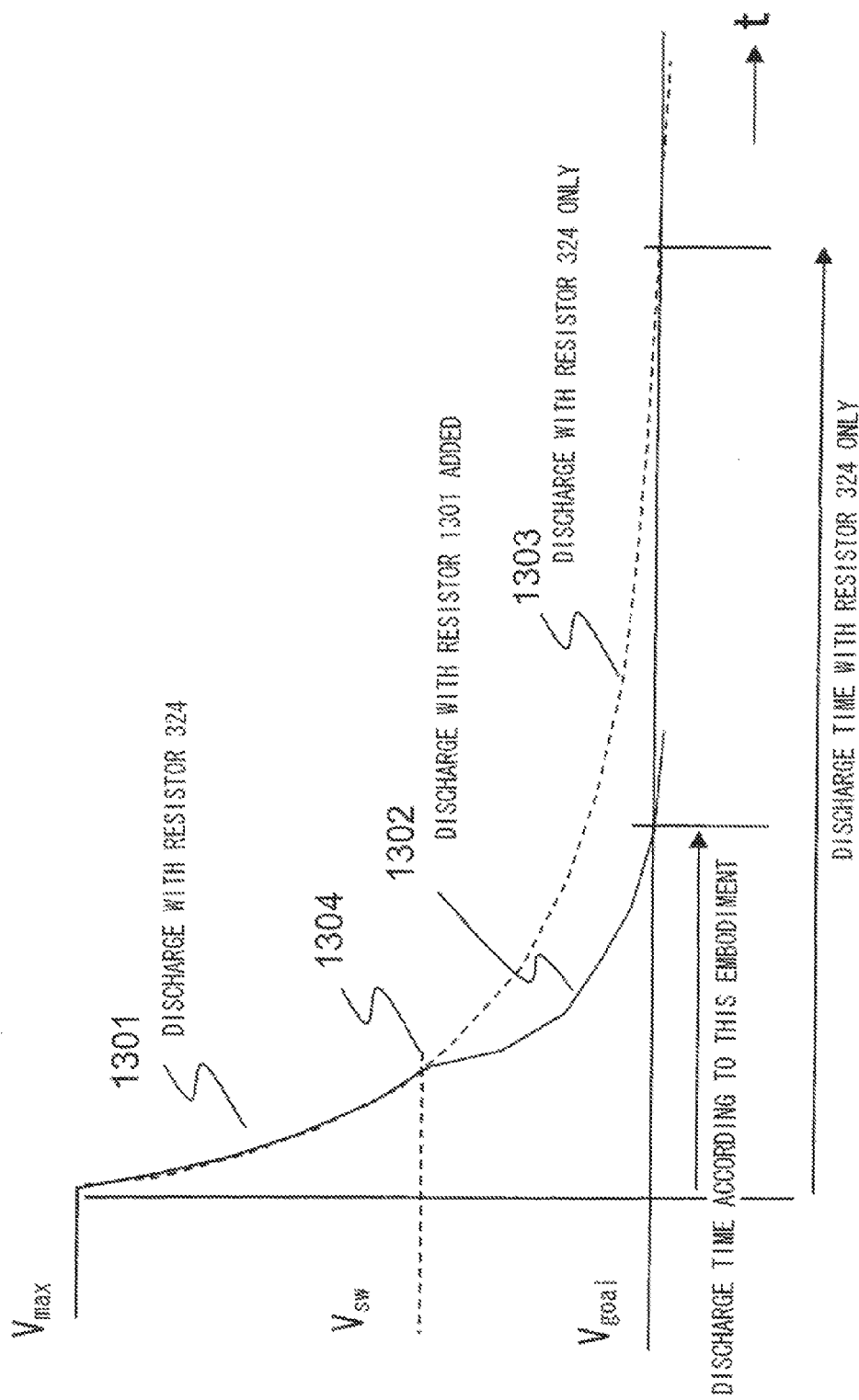
FIG. 13 is a figure showing the discharge waveform that results from the operation of the discharge circuit shown in FIG. 12.

FIG. 13 is a figure showing the discharge waveform produced by the operation of the discharge circuit shown in FIG. 12. First, when the first switching element 325 is turned ON, discharge is started only via the first discharge resistor 324, and the voltage of the DC power supply smoothing capacitor 326 decreases along the solid line 1301. And, when the voltage across the capacitor 326 becomes $V_{sw} = (V_{max} + V_{goal})/2$, the second switching element 1202 is turned ON and discharge is started via the second discharge resistor 1201. Subsequently, discharge is performed via both the first discharge resistor 324 and the second discharge resistor 1201, and the voltage of the DC power supply smoothing capacitor 326 decreases along the solid line 1302. It should be understood that the broken line 1303 shows the voltage waveform that would be produced if discharge was continued via only the first discharge resistor 324 until termination. When the voltage waveforms 1301 and 1302 shown by the solid lines are compared with the voltage waveform 1303 shown by the broken line, it will be understood that, according to this embodiment, the discharge time has been substantially shortened.

Moreover, it should be understood that if a resistor having the same power rating as that of the first discharge resistor 324 is used for the second discharge resistor 1201, then, if it is supposed that the maximum powers of both of the discharge resistors 324 and 1201 are to be equal, the resistance value R2 of the second discharge resistor 1201 may be derived as follows:

$$V_{max}{}^2/R1 = \{(V_{max}+V_{goal})/2\}{}^2/R2$$

Accordingly $$R2 = \{(V_{max}+V_{goal})/2\} \cdot R1/V{max}{}^2 \quad (8)$$

It should be understood that if, for example, the maximum discharge voltage $V_{max}$ is 600 V, the capacitance C of the capacitor 326 is 2000 μF, and the target discharge voltage $V_{goal}$ is 50 V, then, for example, the resistance value R1 of the first discharge resistor R1 is 400Ω, and the resistance value of the second discharge resistor 1201 is 120 Ω.

According to the embodiments shown in FIGS. 12 and 13, it is possible to shorten the discharge period even if a discharge resistor is used whose rated power is not great, and that is not large in size.

It should be understood that it would be possible to combine the embodiments described above with one another, and with one or more of the variant embodiments also described, in any of various possible combinations.

According to the embodiments described above, the following beneficial operational advantages may be obtained. First, it is arranged to provide this discharge circuit for the DC power supply smoothing capacitor 326 that is used in the power conversion device 200 that supplies the DC power of the battery 136 via the contactor (i.e. switch) 304 to the DC power supply smoothing capacitor 326 and the inverter device 140, and this discharge circuit includes the resistor 324 that discharges the charge in the capacitor 326, the switching element 325 that is connected in series with the resistor 324 and that either passes or intercepts discharge current flowing from the capacitor 326 to the resistor 324, the measurement circuits 317 and 319 that measure the terminal voltage of the capacitor 326, and the microcomputer 319 that controls the continuity and discontinuity of the switching element 325, with the microcomputer 319, after having made the switching element 325 continuous and starting discharge by the resistor 324, if the terminal voltage of the capacitor 326 as measured by the measurement circuits 317 and 319 substantially exceeds a voltage decrease characteristic set in advance, makes the switching element 325 discontinuous and stops discharge of the capacitor 326 by the resistor 324; and accordingly, even if during discharge of the capacitor 326 by the resistor 324 the contactor 304 becomes closed (i.e. ON) for some reason, still it is possible reliably to stop discharge by the resistor 324, and it is therefore possible to stop discharge current from continuing to flow in the resistor 324.

Moreover since, according to the embodiment described above, it is arranged to set the voltage decrease characteristic of the condenser 326 to be the characteristic of discharge of the capacitor 326 by the resistor 324, accordingly it is possible to detect a fault in which the contactor 304 becomes closed (i.e. ON) during discharge in an accurate manner.

Furthermore since, according to the embodiment described above, it is arranged for the microcomputer 319 to make the decision as to whether to continue or stop discharge at intervals determined in advance, on the basis of comparison between the terminal voltage of the capacitor 326 as measured by the measurement circuits 317 and 319, and the voltage decrease characteristic, accordingly it is possible to detect a circuit-closed (ON) fault of the contactor 304 during discharge quickly.

And since, according to the first embodiment described above, it is arranged for the microcomputer 319 to obtain the voltage decrease characteristic by calculation in advance on the basis of the terminal voltage of the capacitor 326 before the start of discharge as measured by the measurement circuits 317 and 319, and a time constant that is determined by the capacitance value of the capacitor 326 and the resistance value of the resistor 324, and to make the decision as to whether to continue or stop discharge by comparing together the voltage decrease characteristic that is the result of the calculation, and the terminal voltage of the capacitor 326 as measured by the measurement circuits 317 and 319, accordingly it is possible to detect a circuit-closed (ON) fault of the contactor 304 during discharge easily.

It should be understood that, as shown in connection with the first embodiment, it would also be acceptable to arrange for the microcomputer 319 to make the decision as to whether to continue or stop discharge by comparing together the ratio between the terminal voltage of the capacitor 326 measured this time by the measurement circuits 317 and 319 and the terminal voltage of the capacitor 326 measured the time before, and a coefficient that is set on the basis of a time constant that is determined by the capacitance value of the capacitor 326 and the resistance value of the resistor 324. By doing this, as compared with the case in which the voltage decrease characteristic is obtained by calculation, it is possible to easily to check the voltage decrease by discharge, while it is also possible to detect the voltage increase due to a circuit-closed (ON) fault of the contactor 304 in an accurate manner.

Moreover since, according to the first embodiment described above, it is arranged for the microcomputer 319 to lengthen the time intervals at which the decision is performed as to whether to continue or stop discharge, in correspondence to the elapsed time after the start of discharge, accordingly it is possible to measure the voltage of the capacitor 326 in an accurate manner while eliminating measurement errors, and it is possible accurately to judge whether or not discharge is completed, and also it is possible to detect the voltage increase due to a circuit-closed (ON) fault of the contactor 304.

Furthermore since, according to the first embodiment described above, it is arranged, if the terminal voltage of the capacitor 326 has substantially exceeded the voltage decrease characteristic and the microcomputer 319 has stopped discharge of the capacitor 326 by the resistor 324, for the microcomputer 319 not to carry out discharge until the first predetermined time period $T_{intv}$ has elapsed, accordingly it is possible to prevent excessive heating of the resistor 324 due to discharge.

Yet further since, according to the first embodiment described above, it is arranged, when for the first time the terminal voltage of the capacitor 326 has substantially exceeded the voltage decrease characteristic and the microcomputer 319 has stopped discharge, for the microcomputer 319 to wait before resuming discharge until the second predetermined time period $T_{intv0}$ has elapsed that is substantially shorter than the first predetermined time period $T_{intv}$, while, when the microcomputer 319 has stopped discharge for the second and subsequent times, the microcomputer 319 waits until the first predetermined time period $T_{intv}$ has elapsed before resuming discharge, accordingly, even if the circuit-open command signal 402 for the contactor 304 sent from a higher level system is delayed a little after the discharge start command 314, still it is possible to prevent it being not possible to start discharge during the relatively long predetermined time period $T_{intv}$, so that it is possible to shorten the time period until discharge is completed.

Even further since, according to the first embodiment described above, it is arranged for the switch to include the first switch 325 and the second switch 1101 connected in series, and also to provide the collector voltage detection circuit 322 that detects the occurrence of a short circuiting fault in the first switch 325, and for the microcomputer 319 normally to start and stop discharge by making continuous and interrupting the first switch 325 with the second switch 1101 remaining continuous, but to interrupt the second switch 1101 and stop discharge if, when discharge is to be stopped, the occurrence of a short circuiting fault in the first switch 325 has been detected by the detection circuit 322, accordingly it is possible to stop discharge in a reliable manner if a short circuiting fault occurs in the first switch 325, and thereby to prevent discharge current from continuing to flow in the resistor 324.

Finally since, according to the first embodiment described above, it is arranged for the resistor that performs discharge of the capacitor 326 to include a first resistor 324 that has a first resistance value and a second resistor 1301 that has a second resistance value that is lower than the first resistance value, for the switch that performs passage and interception of the discharge current to include a third switch 325 that is connected in series with the first resistor 324 and performs passage or interception of discharge current flowing from the capacitor 326 to the first resistor 324, and a fourth switch 1202 that is connected in series with the second resistor 1301 and performs passage or interception of discharge current flowing from the capacitor 326 to the second resistor 1301; and for the microcomputer 319 to start discharge of the capacitor 326 by the first resistor 324 by making the third switch 325 continuous, and, when the terminal voltage of the capacitor 326 as measured by the measurement circuits 317 and 319 reaches the predetermined voltage $V_{sw}$ or less, makes the fourth switch 1202 continuous and starts discharge of the capacitor 326 by the second resistor 1301 in addition to discharge of the capacitor 326 by the first resistor 324, accordingly it is possible to shorten the time period over which the capacitor 326 is discharged by using both the first resistor 324 and the second resistor 1301, both of which can have relatively low power ratings.

The above described embodiments are examples, and various modifications can be made without departing from the scope of the invention.

What is claimed is:

1. A discharge circuit for a DC power supply smoothing capacitor that is used in a power conversion device that is supplied with electrical power from a DC power supply via a contactor, the discharge circuit comprising:

a resistor that discharges charge in the capacitor;

a switch connected in series with the resistor, that either passes or intercepts discharge current flowing from the capacitor to the resistor;

a measurement circuit that measures a terminal voltage of the capacitor; and a control circuit that controls continuity and discontinuity of the switch;

wherein:

the control circuit, after having made the switch continuous and starting discharge of the capacitor by the resistor, in predetermined time intervals repeatedly executes comparisons between the terminal voltage of the capacitor as measured by the measurement circuit and a predetermined voltage decrease characteristic, and when the terminal voltage of the capacitor becomes less than or equal to the predetermined voltage decrease characteristic:

the control circuit determines the contactor to be normal, a decision is made as to whether or not the terminal voltage of the capacitor has reached a target discharge voltage that is set in advance, and if the target discharge voltage has been reached:

the discharge circuit turns off the switch such that discharge is stopped, the discharge circuit waits for a predetermined inactive period of time ($T_{intv}$) corresponding to an amount of time necessary for a temperature of the resistor to decrease by a given amount, and after $T_{intv}$ has elapsed, the control circuit restarts discharge.

2. A discharge circuit for a DC power supply smoothing capacitor according to claim 1, wherein:

the control circuit executes a comparison between the terminal voltage of the capacitor as measured by the measurement circuit at a predetermined time $T_i$ after starting measurement, where $T_i$ is an elapsed time given by T·i, T is one of the predetermined time intervals, and i is an integer greater than 1, and before starting discharge of the capacitor, the predetermined voltage decrease characteristic is calculated from a time constant based on a terminal voltage V0 of the capacitor as measured before the start of discharge by the measurement circuit, a capacitance value C of the capacitor, a resistance value R of the resistor, and the predetermined time $T_i$.

3. A discharge circuit for a DC power supply smoothing capacitor according to claim 2, wherein:

the control circuit compares a ratio $V_i/V_{i-1}$ with a factor K, where K is calculated as K =exp(−T/RC) at every predetermined time interval T, $V_{i-1}$ is a terminal voltage of the capacitor measured at time $T_{i-1}$, $T_{i-1}$ is an elapsed time given by T·(i−1), and $V_i$ is a terminal voltage of the capacitor measured at time $T_i$, and the control circuit makes the switch discontinuous and stops discharge if the factor K is smaller than the ratio $V_i/V_{i-1}$, and continues discharge otherwise.

4. A discharge circuit for a DC power supply smoothing capacitor according to claim 1, wherein:

the control circuit lengthens the predetermined time intervals in correspondence to an elapsed time after start of discharge.

5. A discharge circuit for a DC power supply smoothing capacitor according to claim 1, wherein;

when a terminal voltage of the capacitor has exceeded the voltage decrease characteristic, the control circuit makes the switch discontinuous and stops discharge by the resistor, and does not start discharge until a first predetermined time period has elapsed.

6. A discharge circuit for a DC power supply smoothing capacitor according to claim 5, wherein:

when for the first time a terminal voltage of the capacitor has exceeded the voltage decrease characteristic and the control circuit has stopped discharge, the control circuit waits before resuming discharge until a second predetermined time period has elapsed that is substantially shorter than the first predetermined time period, while, when the control circuit has stopped discharge for the second and subsequent times, the control circuit waits until the first predetermined time period has elapsed before resuming discharge.

7. A discharge circuit for a DC power supply smoothing capacitor according to claim 1, wherein:
- the resistor comprises a first resistor that has a first resistance value and a second resistor that has a second resistance value that is lower than the first resistance value;
- the switch comprises a first switch that is connected in series with the first resistor and performs passage or interception of discharge current flowing from the capacitor to the first resistor, and a second switch that is connected in series with the second resistor and performs passage or interception of discharge current flowing from the capacitor to the second resistor; and
- the control circuit starts discharge of the capacitor by the first resistor by making the first switch continuous, and, when a terminal voltage of the capacitor as measured by the measurement circuit reaches a predetermined voltage or less, makes the second switch continuous and starts discharge of the capacitor by the second resistor in addition to discharge of the capacitor by the first resistor.

* * * * *